United States Patent
Julien

(10) Patent No.: US 11,777,868 B2
(45) Date of Patent: Oct. 3, 2023

(54) APPLICATION-SPECIFIC PACKET PROCESSING OFFLOAD SERVICE

(71) Applicant: Telefonaktiebolaget LM Ericsson (publ), Stockholm (SE)

(72) Inventor: Martin Julien, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 47 days.

(21) Appl. No.: 17/634,149

(22) PCT Filed: Aug. 15, 2019

(86) PCT No.: PCT/IB2019/056938
§ 371 (c)(1),
(2) Date: Feb. 9, 2022

(87) PCT Pub. No.: WO2021/028719
PCT Pub. Date: Feb. 18, 2021

(65) Prior Publication Data
US 2022/0321496 A1    Oct. 6, 2022

(51) Int. Cl.
*H04L 47/78* (2022.01)
*H04L 47/762* (2022.01)
(Continued)

(52) U.S. Cl.
CPC .......... *H04L 47/781* (2013.01); *H04L 47/762* (2013.01); *H04L 47/803* (2013.01); *H04L 47/822* (2013.01)

(58) Field of Classification Search
CPC ... H04L 47/762; H04L 47/781; H04L 47/803; H04L 47/822
(Continued)

(56) References Cited

U.S. PATENT DOCUMENTS

| | | | |
|---|---|---|---|
| 9,600,429 B2 * | 3/2017 | Pope | G06F 13/4282 |
| 2015/0180736 A1 | 6/2015 | Leung | |
| 2016/0110214 A1* | 4/2016 | Vincent | H04L 41/082 718/1 |

FOREIGN PATENT DOCUMENTS

| | | |
|---|---|---|
| KR | 20190033022 A | 3/2019 |
| WO | 2017067586 A1 | 4/2017 |
| WO | 2019135704 A1 | 7/2019 |

OTHER PUBLICATIONS

International Search Report and Written Opinion for Application No. PCT/IB2019/056938, dated Mar. 13, 2020, 12 pages.
(Continued)

*Primary Examiner* — Wing F Chan
*Assistant Examiner* — Leon Y Tseng
(74) *Attorney, Agent, or Firm* — Nicholson De Vos Webster & Elliott LLP

(57) ABSTRACT

A method for offloading network operations is described. The method includes receiving an offload service capabilities request message from a first application to request information from an offload service regarding capabilities of the offload service that meet a set of requirements; transmitting a response to the application that includes a set of offload service templates that are (1) selected based on the application requirements and (2) possible templates to be modified for performing operations of the application; evaluating the network resources for the program code of the application to select a set of network resources for offloading the operations of the first application to the network resources; and installing the program code, which was generated based on a set of offload service templates, on the set of network resources such that the set of network resources process packets from a second application that are addressed to the first application.

20 Claims, 28 Drawing Sheets

(51) Int. Cl.
*H04L 47/80* (2022.01)
*H04L 47/70* (2022.01)

(58) Field of Classification Search
USPC .......................................... 709/226
See application file for complete search history.

(56) References Cited

OTHER PUBLICATIONS

"P4₁₆ Language Specification, version 1.0.0," May 22, 2017, 129 pages, The P4 Language Consortium.
"P4Runtime Specification, version 1.0.0-rc3," Oct. 1, 2018, 81 pages, The P4.org API Working Group.
"P4₁₆ Portable Switch Architecture (PSA), Version 1.1," Nov. 22, 2018, 68 pages, The P4.org Architecture Working Group.

\* cited by examiner

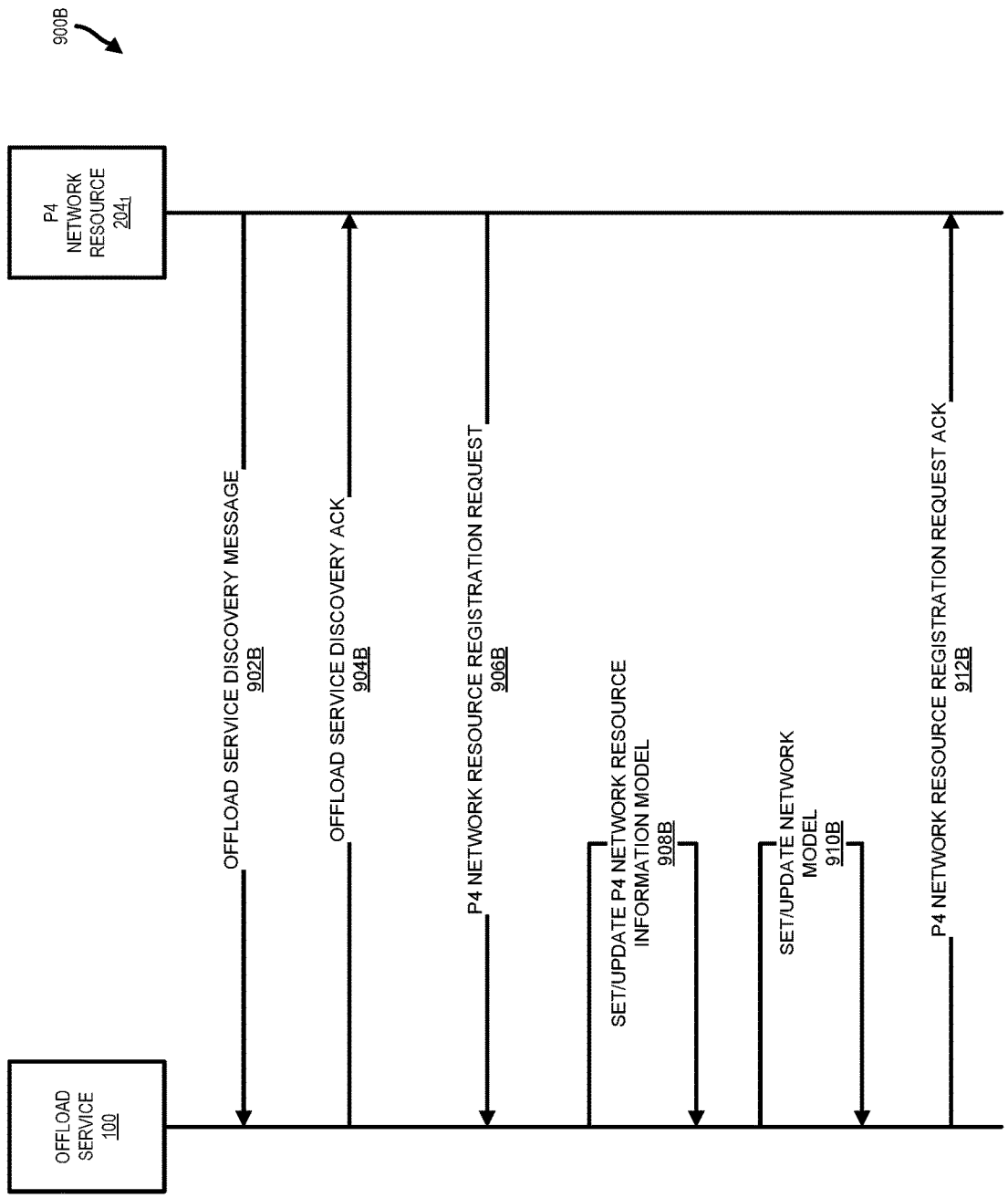

APPLICATION-SPECIFIC PACKET PROCESSING OFFLOAD SERVICE

CROSS-REFERENCE TO RELATED APPLICATIONS

This application is a National stage entry of International Application No. PCT/IB2019/056938, filed Aug. 15, 2019, which is hereby incorporated by reference.

TECHNICAL FIELD

Embodiments of the invention relate to the field of packet processing; and more specifically, to an offload service that allocates packet processing on behalf of applications to a set of network resources.

BACKGROUND ART

Several technologies are available to improve the performance of applications, depending on the intended purpose of those applications. For example, for networking applications providing packet switching and routing capabilities, technologies such as single root input/output virtualization (SR-IOV) and Network Interface Cards (NICs) can be used to improve the processing performance of such applications. While those technologies are meant to accelerate networking performance, they also typically only provide generic networking acceleration capabilities rather than application-specific packet processing logic acceleration.

Applications that can benefit directly from application-specific offload capabilities are typically implemented in a proprietary manner with a tight integration with specialized software or hardware components providing the required acceleration technology for those specific applications. Such a tight integration with components providing the desired acceleration capabilities can make applications completely dependent on those technologies, which is not desirable in the context of cloud computing and virtualization that deal with a wide breadth of applications. Also, such solutions are typically difficult to scale and limited to a single application, not allowing other applications to share the same acceleration component(s).

SUMMARY

A method for offloading network operations of a first application to network resources in a network system is described. The method includes receiving, by an offload service, an offload service capabilities request message from the first application, wherein the offload service capabilities request message requests information from the offload service regarding capabilities of the offload service that meet a set of requirements provided by the first application; transmitting, by the offload service, an offload service capabilities request message response to the first application, wherein the offload service capabilities request message response includes a set of offload service templates that are (1) selected by the offload service based on the set of requirements of the first application and (2) possible templates to be modified for performing network operations of the first application, wherein each template in the set of offload service templates includes one or more of a parameter list to be modified for performance of the network operations of the first application, a set of code stubs for use in generating program code for performance of the network operations of the first application, and a set of libraries for use in generating the program code; evaluating, by the offload service, the network resources for the program code of the first application to select a set of network resources for installing the program and offloading the operations of the first application to the set of network resources; and installing, by the offload service, the program code for the first application, which was generated based on the set of offload service templates, on the set of network resources such that the set of network resources process one or more of (1) packets from a second application that are addressed to the first application and (2) packets from the first application that are addressed to the second application.

A non-transitory machine-readable storage medium that provides instructions that, if executed by a processor of a device in a network system, will cause said processor to perform operations is also described. The operations include receiving an offload service capabilities request message from a first application, wherein the offload service capabilities request message requests information from an offload service regarding capabilities of the offload service that meet a set of requirements provided by the first application; transmitting an offload service capabilities request message response to the first application, wherein the offload service capabilities request message response includes a set of offload service templates that are (1) selected by the offload service based on the set of requirements of the first application and (2) possible templates to be modified for performing network operations of the first application, wherein each template in the set of offload service templates includes one or more of a parameter list to be modified for performance of the network operations of the first application, a set of code stubs for use in generating program code for performance of the network operations of the first application, and a set of libraries for use in generating the program code; evaluating the network resources for the program code of the first application to select a set of network resources for installing the program and offloading the operations of the first application to the set of network resources; and installing the program code for the first application, which was generated based on the set of offload service templates, on the set of network resources such that the set of network resources process one or more of (1) packets from a second application that are addressed to the first application and (2) packets from the first application that are addressed to the second application.

Further described is a device for offloading network operations of a first application to network resources in a network system, the device to: receive an offload service capabilities request message from the first application, wherein the offload service capabilities request message requests information from an offload service regarding capabilities of the offload service that meet a set of requirements provided by the first application; transmit an offload service capabilities request message response to the first application, wherein the offload service capabilities request message response includes a set of offload service templates that are (1) selected by the offload service based on the set of requirements of the first application and (2) possible templates to be modified for performing network operations of the first application, wherein each template in the set of offload service templates includes one or more of a parameter list to be modified for performance of the network operations of the first application, a set of code stubs for use in generating program code for performance of the network operations of the first application, and a set of libraries for use in generating the program code; evaluate the network resources for the program code of the first application to select a set of network resources for installing the program and offloading the operations of the first application to the set of network resources; and install the program code for the first application, which was generated based on the set of offload service templates, on the set of network resources such that the set of network resources process one or more of (1) packets from a second application that are addressed to the first application and (2) packets from the first application that are addressed to the second application.

As described herein, the offload service can be used by applications to dynamically request certain application-specific packet processing logic implementations to be offloaded to P4 network resources available on the associated network infrastructure domain. The offload service has a holistic system view of system-wide P4 network resources, which allows the offload service to learn the associated network topology as well as detailed information on all P4 network resources available on that network infrastructure, such as their location, their supported P4 architectures, their characteristics, etc. That holistic system view enables the offload service to find the most appropriate P4 network resource(s) available to deploy an application-specific packet processing offload logic implementation, assuring the most efficient packet processing offload performance.

BRIEF DESCRIPTION OF THE DRAWINGS

The invention may best be understood by referring to the following description and accompanying drawings that are used to illustrate embodiments of the invention. In the drawings:

FIG. 9B shows a data flow diagram for a P4 network resource to register with the offload service, according to one example embodiment.

DETAILED DESCRIPTION

Figure 1:
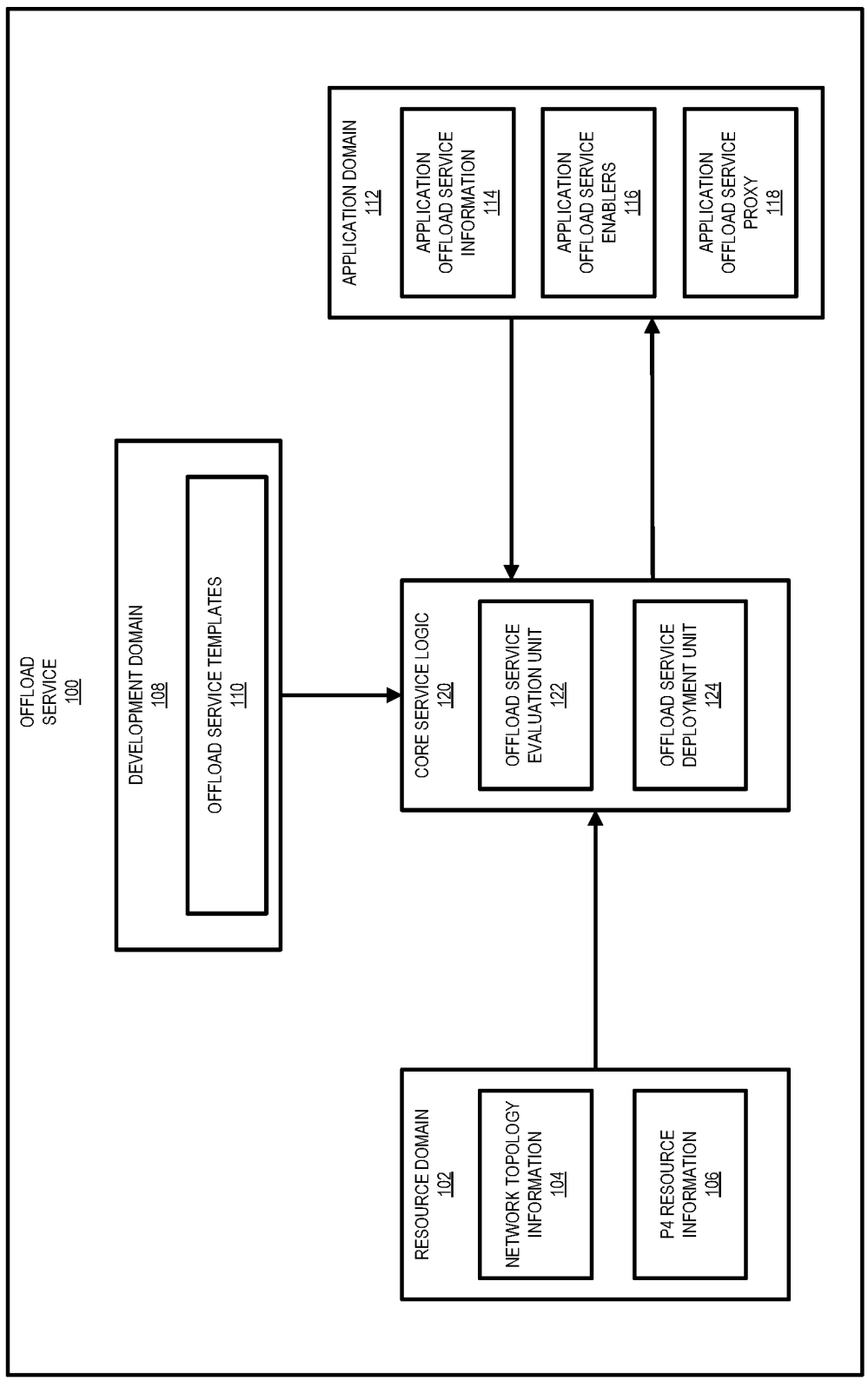
FIG. 1 presents a logical representation of a set of functional blocks of an offload service that can be used to manage the deployment and enforcement of application-specific packet processing offload requirements and corresponding application-specific packet processing offload logic, according to one example embodiment.

The following description describes methods and apparatus for an offload service that allocates packet processing on behalf of applications to a set of network resources. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As will be described in greater detail herein, a P4 packet processing offload service (sometimes referred to simply as an offload service) is presented that can be used by applications to dynamically specify their own application-specific packet processing offload requirements for allocation to P4 network resources. The application-specific packet processing offload requirements (sometimes referred to as offload requirements) are specified by applications leveraging P4 technology. As used herein, P4 is a technology that is designed to program data plane functionality of network devices/resources and to partially define interfaces between control and data planes. P4 devices/resources are available in software virtual appliances and in hardware devices (e.g., Network Interface Cards (NICs) and Ethernet switches). Although described in relation to P4 technology and corresponding P4 network devices, the techniques described herein can be similarly applied to other technologies that provide a language for expressing how packets are processed by a data plane of a programmable forwarding element, such as a hardware or a software switch, network interface card, router, or network appliance. Accordingly, the use of P4 technology is for illustrative purposes.

The offload service described herein fulfills offload requirements of applications by deploying corresponding application-specific packet processing offload logic, which may be embodied in P4 programs/code, to available P4 network resources of the associated network infrastructure domain. As used herein, the term "offload" is meant to reflect that certain operations that could be performed by an application itself are instead performed by other system components (e.g., P4 network resources) on behalf of the application, with the purpose of increasing overall system efficiency.

FIG. 1 presents a logical representation of a set of functional blocks of an offload service 100 that can be used to manage the deployment and enforcement of application-specific packet processing offload requirements and corresponding application-specific packet processing offload logic, according to one example embodiment. As shown in FIG. 1, the offload service 100 can include a resource domain 102, which includes network topology information 104 and P4 resource information 106. The network topology information 104 (sometimes referred to as a network model) includes information associated with network topology, including information regarding the interconnections between networking elements (e.g., P4 network resources and non-P4 network resources) of an associated network infrastructure and their interconnections with compute/storage resources where applications are deployed. The network topology information 104 could be provided directly to the offload service 100 or could be dynamically discovered by the offload service 100. In some embodiments, visibility of the network topology information 104 to the offload service 100 could be limited in scope. For example, the network topology information 104 provided to the offload service 100 could be limited to only the interconnections between a set of servers and their directly connected networking resources. The offload service 100 can use the network topology information 104 to help determine the most appropriate location to deploy an application-specific packet processing offload logic implementation.

P4 resource information 106 (sometimes referred to as a network resource information model) includes information on all P4 network resources available on the associated network infrastructure domain and within the network topology visibility of the offload service 100 (e.g., as dictated by the network topology information 104). The detailed information on each P4 network resource is useful to the offload service 100 to make appropriate decisions regarding the deployment and monitoring of application-specific packet processing logic implementations. For example, P4 network resources would be expected to minimally provide their unique identity, their capabilities (e.g., processing and memory availability), their system characteristics (e.g., an associated architecture corresponding to a particular compiler), and their position within the network infrastructure domain. Each P4 network resource could also be requested to provide the necessary development environment and other P4 network resource-specific information, if needed.

In some embodiments, each P4 network resource can be monitored continuously to report the amount of resources available and already allocated, as well as all related analytic information. This information could be used, for example, by the offload service 100 to determine whether an application-specific packet processing offload logic implementation is working as expected (e.g., whether all application-specific packet processing offload requirements are fulfilled).

As shown in FIG. 1, the offload service 100 can include a development domain 108 that includes offload service templates 110. The offload service templates 110 allow applications to configure their specific offload service specifications. The offload service templates 110 also include or represent a P4 architecture, P4 libraries, and development tools that allow application developers to write their own application-specific packet processing offload logic implementations as P4 programs/code. In some embodiments, all the P4 network resources of the associated network infrastructure domain share the same P4 architecture to allow any application-specific packet processing offload logic implementations to be deployed on any available P4 network resource without recompilation or specific program adaptations. As also shown in FIG. 1, the offload service 100 can include an application domain 112 that includes application offload service information 114, application offload service enablers 116, and an application offload service proxy 118. The application offload service information 114 includes information on each application requesting offload services from the offload service 100, including information on all submitted application-specific packet processing offload requirements. For example, as each application provides their application-specific packet processing offload requirements along with their application-specific packet offload logic implementations, the offload service 100 can use that information to evaluate the best packet processing offload opportunities for each application. In this configuration, interaction between applications 202 can be performed via the application offload service proxy 118 of the offload service 100 to allow the applications 202 to manage, configure, provision, and communicate with the offload service 100. In some embodiments, packets addressed to an application 202 are either (1) processed by corresponding network resources 204 and thereafter forwarded to the application offload service proxy 118 before arriving at the targeted application 202 or (2) transmitted to the application offload service proxy 118 and forwarded to the set of network resources 204 for processing before arriving at the targeted application 202.

The application offload service enablers 116 provide information and software utilities to applications for integrating with the offload service 100. In particular, each application could be provided with corresponding enablers 116 to fully exploit the offload service 100. For example, enablers 116 could include automatically generated application programming interfaces (APIs) and client-server stubs, as well as potentially providing specific management and monitoring tools.

In some embodiments, the offload service 100 provides application developers with a test implementation of their application-specific offload service logic implementation, which could be used to validate a proper integration of their application(s) with the offload service 100. Such a test implementation could reflect the application-specific packet processing offload logic implementation during an initial validation phase, or it could reflect a more integrated test implementation during a deployment phase. Such an integrated test implementation could be meant to more realistically reflect the real P4 implementation running on the P4 network resource(s) allocated for the offload logic deployment.

Figure 2:
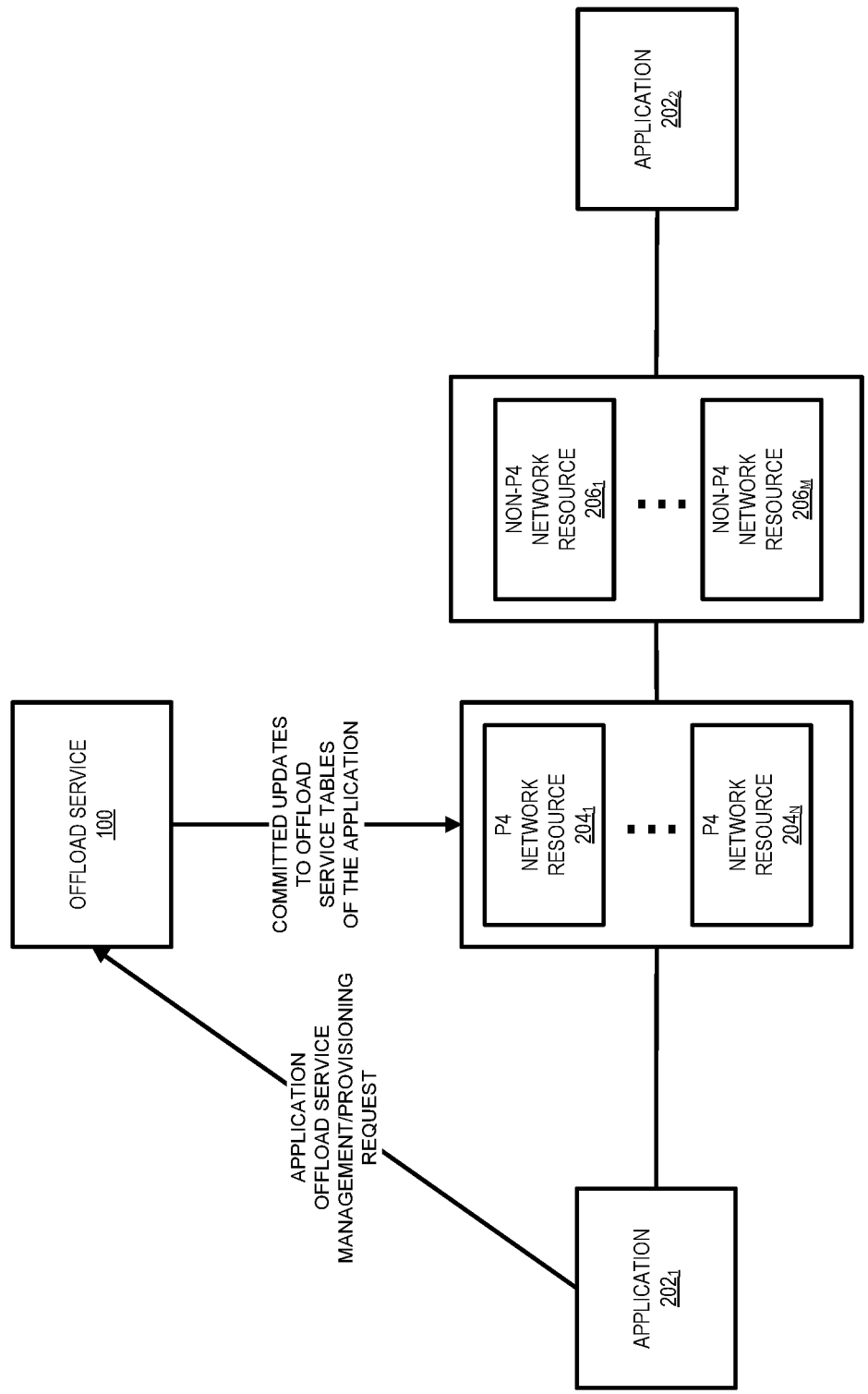
FIG. 2 shows a data flow between a pair of applications via a set of P4 network resources and the offload service, according to one example embodiment.

The application offload service proxy 118 provides a proxy for service management and provisioning requests between applications and the requested application-specific packet processing offload logic implementations. Assuming an application-specific packet processing offload logic implementation would require being provisioned dynamically, the offload service 100 could act as a proxy service for that purpose. For example, FIG. 2 shows a data flow between a pair of applications $202_1$ and $202_2$ via a set of P4 network resources $204_1$-$204_N$ and the offload service 100. In particular, the application $202_1$ transmits an application offload service management/provisioning request to the offload service 100. The request could go through the application offload service proxy 118, which could either be provided within the offload service 100 or running on the P4 network resources 204 themselves. In this configuration, the offload service 100 could act as a proxy and transmit committed offload service tables of the application $202_1$ to the set of P4 network resources $204_1$-$204_N$. The set of P4 network resources $204_1$-$204_N$ can thereafter process packets on behalf of the application $202_1$, which may be possibly routed to the set of P4 network resources $204_1$-$204_N$ from the application $202_2$ via a set of non-P4 network resources $206_1$-$206_M$. As described, the management and provisioning requests are separate and independent from packets exchanged between applications 202. Further, only the application 202 owning an application offload program is permitted to manage/provision it for packets exchanged between applications 202.

From a security perspective, the above-described configuration could allow the offload service 100 to specify its own level of security requirements for protecting application-specific packet processing offload logic implementations, as well as isolating the P4 network resources 204 from being directly accessed by applications 202. However, for trusted applications and services, the offload service 100 could optionally allow applications 202 to directly interface with their application-specific packet processing offload logic implementation.

During the validation phase of an application-specific packet processing offload logic implementation, a test provisioning proxy could be provided to application developers for validating the integration of their applications 202 with the offload service 100. During the deployment phase, and once the application-specific packet processing offload logic implementation has been fully deployed, a fully integrated provisioning proxy can be provided to the application 202 to manage its own application-specific packet processing offload logic implementation.

Figure 3:
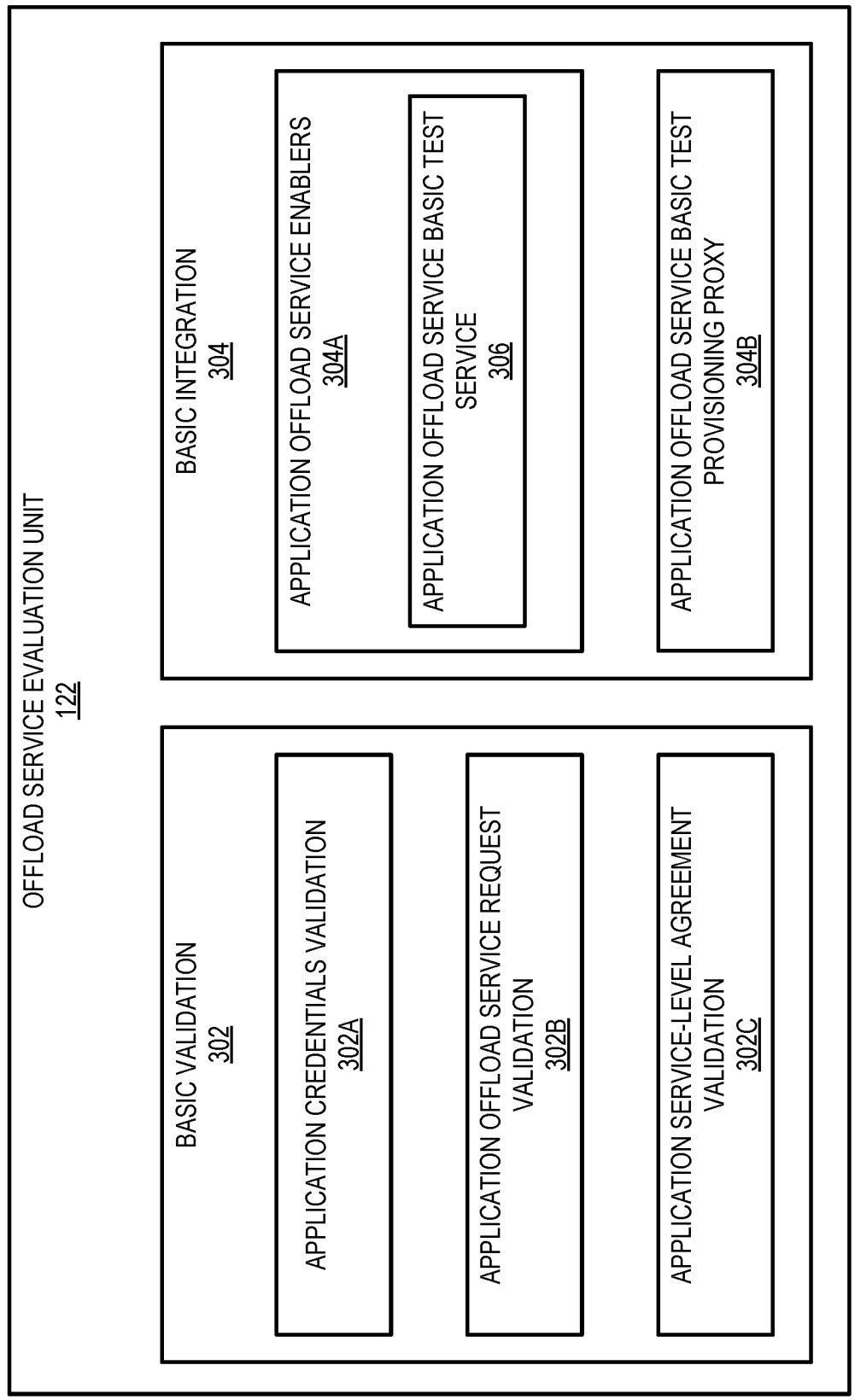
FIG. 3 shows an offload service evaluation unit, according to one example embodiment.

As also shown in FIG. 1, the offload service 100 can include core service logic 120 that includes an offload service evaluation unit 122 and an offload service deployment unit 124. As shown in FIG. 3, the offload service evaluation unit 122 can validate application 202 requests for the offload service 100 and allows application developers to integrate and validate their application 202 with the offload service 100 before the overall application-specific packet processing offload logic implementation can be officially deployed on an associated network infrastructure domain. In particular, the offload service evaluation unit 122 includes basic validation 302, which provides application credentials validation 302A, application offload service request validation 302B, and application service-level agreement (SLA) validation 302C. Further, the offload service evaluation unit 122 includes basic integration 304, which provides application offload service enablers 304A (e.g., application offload service basic test service 306) and application offload service basic test provisioning proxy 304B.

Included in evaluating an application request for the offload service 100 is analyzation of information provided by the application 202 upon registration with the offload service 100. During the application offload service request process, it is assumed that an application 202 would minimally provide information on its requested SLA specifications with the offload service 100 via an offload service template 110 in addition to the P4 program implementing its intended application-specific packet processing offload logic. The offload service 100 validates information received during the registration of the application 202 with the offload service 100. Validation criteria might be based (1) on the result of a compilation of the P4 program of the application 200 using specified offload service parameters and/or (2) on the amount of P4 network resources 204 required for enabling the application-specific packet processing offload logic implementation. Those validation checks can be performed automatically by the offload service 100.

Once the basic validation checks are completed, application developers are provided with the application offload service enablers 304A for accessing and testing their requested application-specific packet processing offload logic implementations. Those application offload service enablers 304A can be used by developers to develop and validate a proper integration of their applications 202 with the offload service 100.

For applications 202 that need to dynamically provision their application-specific packet processing offload logic implementation, an application offload service basic test provisioning proxy 304B could also be provided, as discussed earlier. Once the evaluation process is completed, the offload service 100 certifies that a request of an application 202 for the offload service 100 complies with all its evaluation criteria for potentially being deployed by the offload service 100 on P4 network resources 204.

The offload service deployment unit 124 identifies P4 network resources 204 suitable to enforce the application-specific packet processing offload implementations. In some embodiments, the most suitable P4 network resources 204 are the P4 network resources 204 closest to the requesting application 202. This could be a P4 network resource 204 located on the same server as the application 202 (e.g., the P4 network resource 204 is a NIC) or a P4 network resource 204 directly connected to the server where the application 202 is deployed (e.g., the P4 network resource 204 is an Ethernet switch). The most suitable P4 network resources 204 for the application-specific offload service logic implementation could minimally depend on information associated with network topology and proximity, availability of P4 network resources 204, and capabilities of P4 network resources 204, as well as potentially on application-specific deployment requirements.

When at least one P4 network resource 204 is allocated by the offload service 100 to run the application-specific packet processing offload logic implementation, the offload service 100 can enforce that the application-specific offload service logic implementation on the allocated P4 network resource 204 through installation on the allocated P4 network resource 204. In the case where an application 202 is deployed on multiple P4 network resources 204, the offload service 100 supports the evaluation and the deployment of the application-specific packet processing offload logic implementation across the multiple P4 network resources 204.

To develop applications using P4 technology, there must be a P4 target along with a P4 architecture and a development environment for that specific target. More specifically, a P4 target is a P4 network resource 204 that could be a software appliance or a hardware device. Considering that each P4 network resource 204 might have its own specific capabilities and characteristics, each P4 target is required to provide at least one P4 architecture to describe its supported packet pipeline and packet paths, along with all the required P4 libraries detailing the supported extra functional blocks and datatypes.

In general, P4 programs/code are not expected to be portable across different P4 architectures. However, P4 programs written for a given architecture should be portable across all P4 targets that faithfully implement the corresponding model/architecture, provided there are enough resources. A P4 architecture can be thought of as a contract between the P4 program and the P4 target.

While the P4 Portable Switch Architecture (PSA) represents a standard P4 architecture for P4 targets, each P4 target could also have its own specific P4 architecture. Assuming the offload service 100 would have to manage many different types of P4 network resources 204, the set of P4 network resources 204 in the network should use a minimum number of P4 architectures and ideally the same standard P4 architecture. It should also be noted that even if all the P4 targets would support the same PSA, they could also have different amounts of resources (e.g., processing power and memory) to offer, which would also have to be specifically managed by the offload service 100.

Figure 4A:
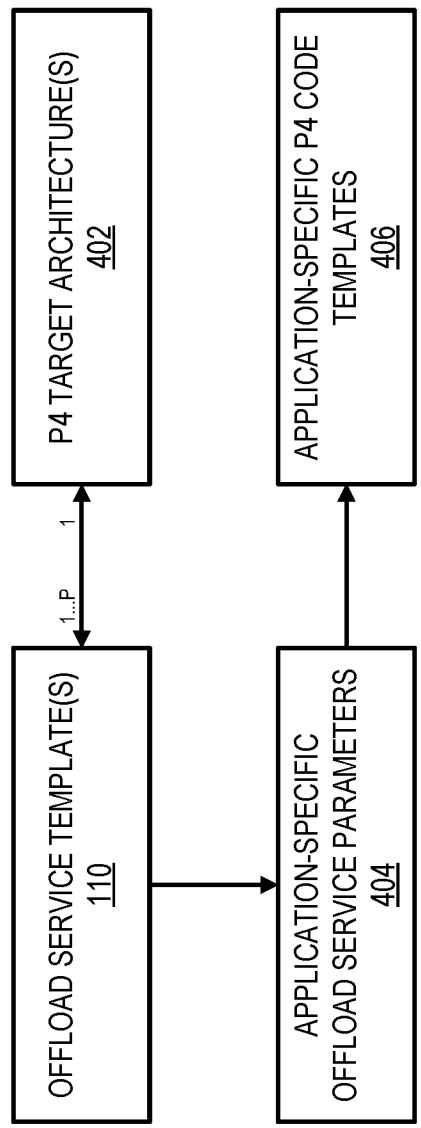
FIG. 4A shows the relationships between offload service templates, P4 target architectures, application-specific offload service parameters, and application-specific P4 code templates, according to one example embodiment.
Figure 4B:
FIG. 4B shows the relationships between application-specific offload service parameters, application-specific P4 code templates, and application-specific P4 code, according to one example embodiment.

The offload service 100 offers offload service templates 110 to application developers for them to specify their intended requirements regarding services provided by the offload service 100. As shown in FIG. 4A, each offload service template 110 specifies a P4 target architecture 402 along with offload service-specific offload service parameters 404. Application-specific offload service parameters 404 can be used to determine the amount of table entries that would be needed by an application 202, the intended distribution scheme, and fault tolerance, etc. An application developer can select and populate the most appropriate offload service template 110 that would fulfill their needs and the offload service 100 generates application-specific P4 code templates 406 for application developers to start writing their own application-specific P4 code 408 (i.e., application-specific offload service logic implementation) as shown in FIG. 4B.

Figure 5:
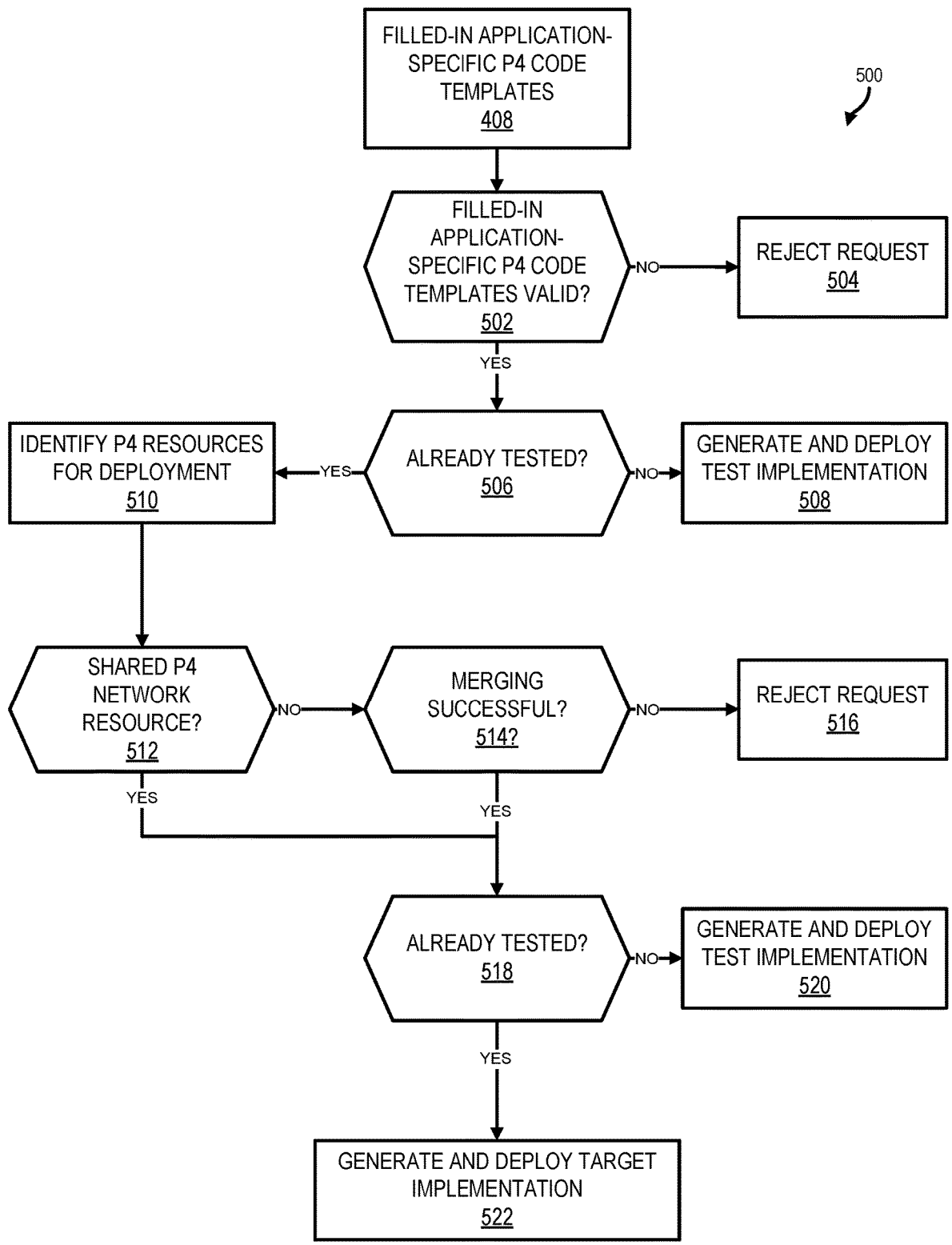
FIG. 5 shows a method for validating and testing application-specific P4 code, according to one example embodiment.

Once application developers have finished implementing their application-specific P4 code 408, application developers validate and test their implementation using tools provided by the offload service 100. For example, as shown in the method 500 of FIG. 5, the filled-in application-specific P4 code templates 406 (including application-specific P4 code 408) can be first checked against the provided offload service architecture (e.g., P4 target architecture 402) and the specified offload service parameters (e.g., application-specific offload service parameters 404) at operation 502. If the filled-in application-specific P4 code templates 406 is not valid, the filled-in application-specific P4 code templates 406 is rejected at operation 504. Conversely, if the filled-in application-specific P4 code templates 406 is valid, then the filled-in application-specific P4 code templates 406 can be properly tested at operations 506-520 before being deployed on P4 target(s) at operation 522.

In particular, the method 500 can first determine if the filled-in application-specific P4 code templates 406 has already been tested successfully (e.g., the application-specific P4 code 408 passes all tests). In response to determining that the filled-in application-specific P4 code templates 406 has not already been tested, the method 500 moves to operation 508 to generate and deploy a test implementation of the application-specific P4 code 408. In particular, for testing application-specific P4 code 408, application developers are provided the required capabilities for testing their application-specific P4 code 408 before deploying it on a live network infrastructure. A first test implementation is proposed to test the application-specific P4 code 408 on the selected offload service architecture with the specified offload service parameters at operation 508. That first test setup tests the application-specific P4 code 408 as a standalone application.

Assuming the filled-in application-specific P4 code templates 406 is valid and working as expected at operation 508 and after determining that the filled-in application-specific P4 code templates 406 has already been tested successfully at operation 506, the offload service 100 identifies specific P4 network resources 204 where the filled-in application-specific P4 code templates 406 should be deployed at operation 510. Depending on the provided offload service parameters and the network infrastructure, it might be required to deploy the filled-in application-specific P4 code templates 406 on multiple different P4 network resources 204. When multiple application-specific P4 code templates 406 share a single P4 network resource 204, as determined at operation 512, a second test implementation is proposed to test the multiple application-specific P4 code templates 406 on a system similar to the allocated P4 network resource 204. In particular, at operation 514, the offload service 100 determines if merging is successful between operations of multiple application-specific P4 code templates 406. When merging is unsuccessful, the offload service determines to reject the request from the application 202 at operation 516. If (1) a shared P4 network resource is 204 is not selected at operation 512 or (2) everything is proven to be working as expected at operation 514, then the offload service determines if a test has been performed on a system similar to the selected P4 network resource(s) 204 at operation 518. If a test has not been already performed, the method 500 moves to operation 520 to generate and deploy a test implementation on a system similar to the selected P4 network resource 204. Conversely, if a test has been already performed, the method 500 moves to operation 522 to deploy the newly generated P4 implementations to the allocated P4 resources.

Figure 6:
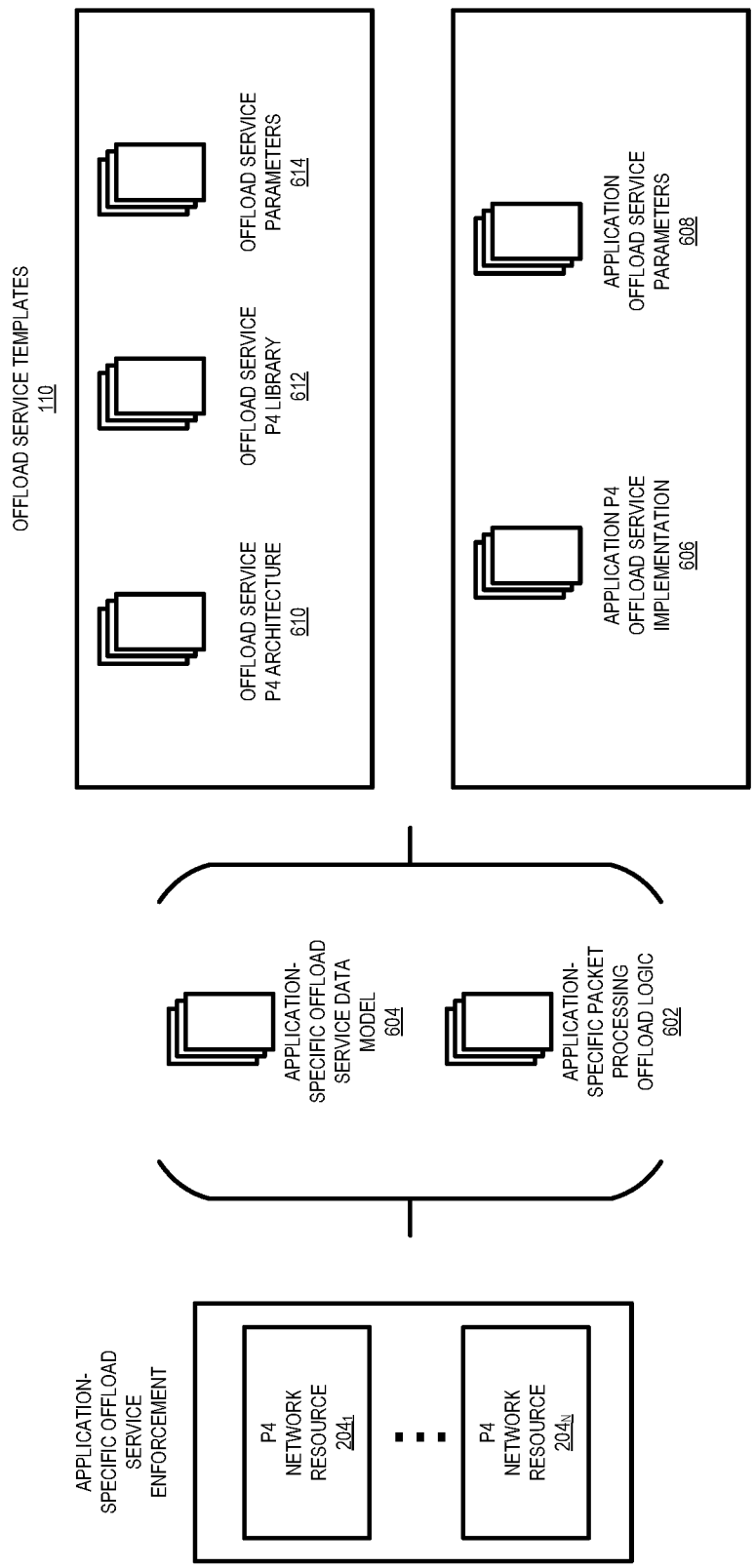
FIG. 6 shows the relationships between P4 network resources, an application-specific offload service data model, application-specific packet processing offload logic, and offload service templates, according to one example embodiment.

As shown in FIG. 6, applications 202 are provided offload service templates 110 to specify their application-specific packet processing offload requirements to the offload service 100. In one embodiment, deployment of an application-specific packet processing offload logic 602 and data model 604 could be parameterized to specify certain deployment and service level expectations, including application P4 offload service implementation 606 and application offload service parameters 608. For example, such deployment parameters could be used to specifically requirements in terms of performance, resiliency and dimensioning, or in terms of required capabilities and deployment constraints.

On the aspect related to the development environment, an appropriate development environment would be available to allow applications 202 to specify their own application-specific packet processing offload logic 602 and data model 604 to the offload service 100. It is envisioned that such a development environment would minimally propose offload service P4 architectures 610 and offload service P4 libraries 612 with corresponding offload service parameters 614 supported by the offload service 100. Those offload service P4 architectures 610 and offload service P4 libraries 612 would then be used by applications to write P4 programs implementing their application-specific packet processing offload logic 602 and data model 604.

Figure 7:
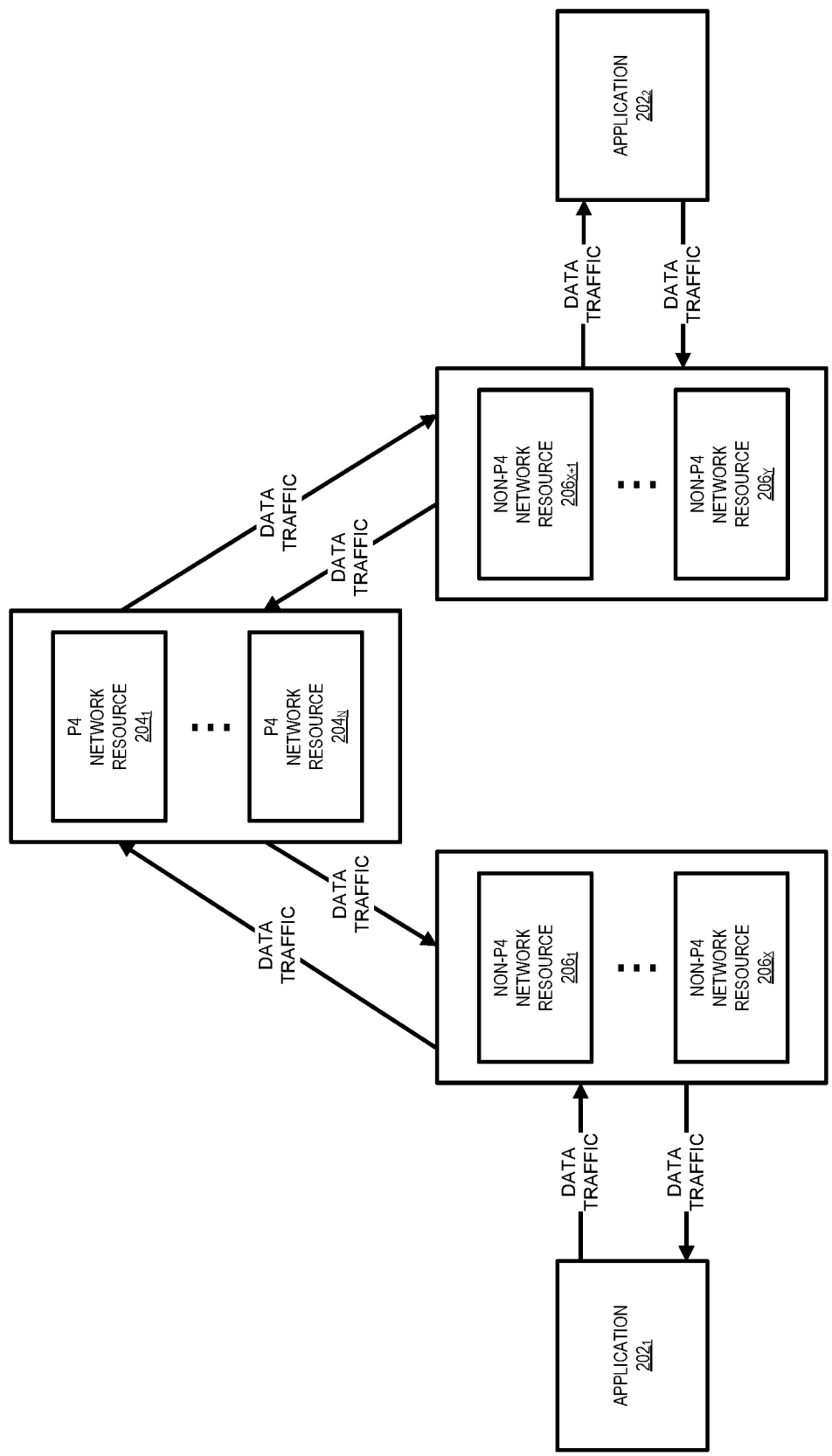
FIG. 7 shows data traffic flows between applications, non-P4 network resources, and P4 network resources, according to one example embodiment.

As shown in FIG. 7, applications 202 might be interconnected together through several different networking elements (e.g., non-P4 network resources 206 and P4 network resources 204), which is the case when applications 202 are deployed on different compute resources of a common cloud network infrastructure. While some of those networking elements might be P4-capable (e.g., the P4 network resources $204_1$-$204_N$), some others might not (e.g., the non-P4 network resources $206_1$-$206_Y$). In example shown in FIG. 7, data traffic is exchanged between application $202_1$ and application $202_2$ with data traffic potentially transiting through a few P4 network resources 204 and non-P4 network resources 206.

In one embodiment, at least one P4 network resource 204 is available on the intended traffic path between applications 202, while there might or might not be any non-P4 network resources 206. The availability of at least one P4 network resource 204 within the associated network infrastructure domain enables the offload service 100 to provide services to applications 202 within the associated system domain. The requirement for having at least one P4 network resource 204 is imposed by the fact that the offload service 100 expects applications 202 to provide their application-specific offload service logic implementation using the P4 technology, which can only be deployed on P4 network resources 204.

Figure 8:
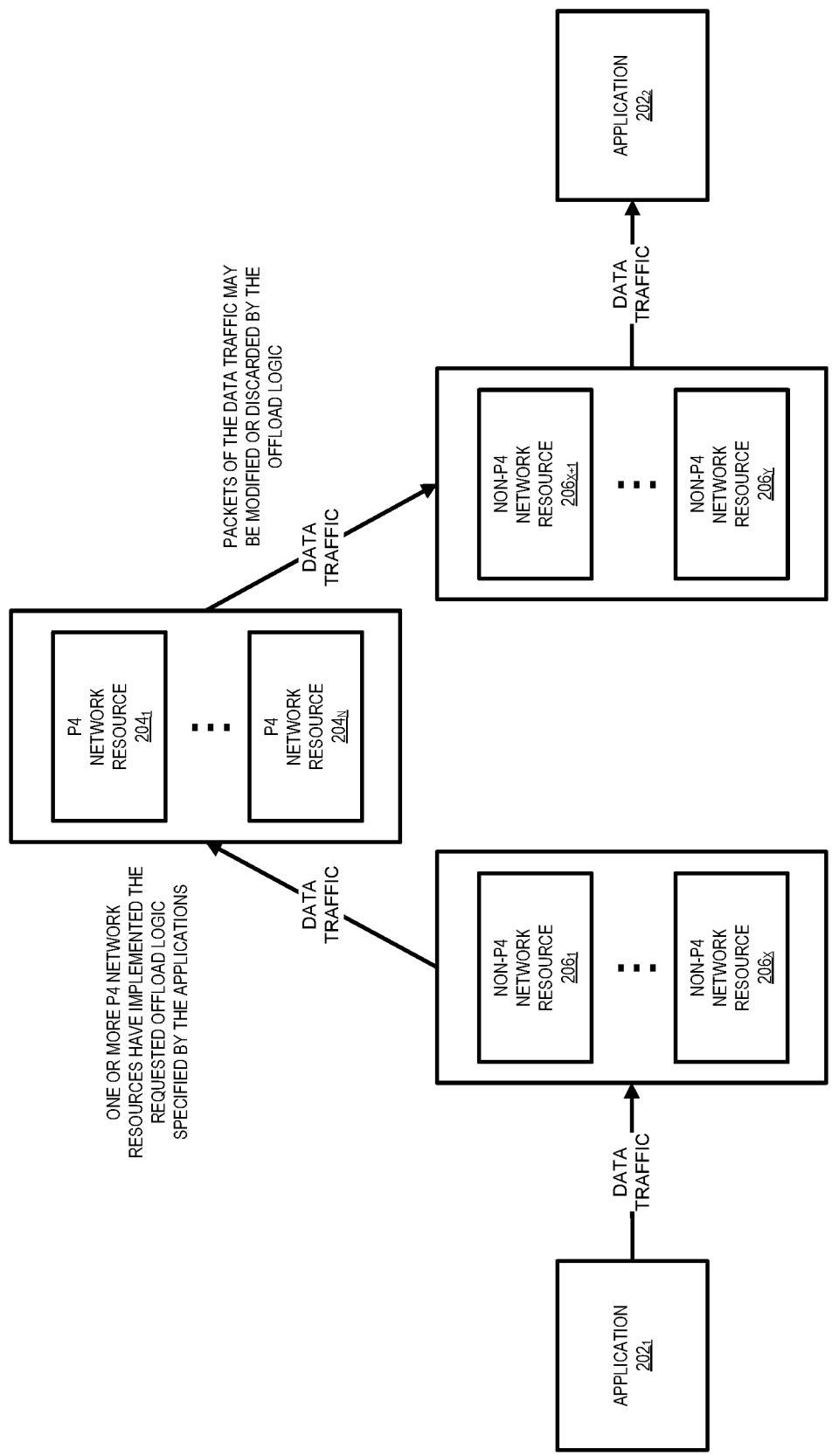
FIG. 8 shows data traffic flows between applications, non-P4 network resources, and P4 network resources, according to another example embodiment.

Considering that the traffic between application $202_1$ and application $202_2$ would always have to transit through at least one or more P4 network resources 204, application $202_1$ and application $202_2$ can leverage on any of those P4 network resources 204 to perform tasks of behalf of the applications 202 themselves. For example, as shown in FIG. 8, where packets are sent from application $202_1$ to application $202_2$, the application $202_2$ could potentially benefit from offloading certain packet processing tasks to P4 network resources 204, so that its pre-processing operations could be performed on its destined packets before reaching the application $202_2$ itself. However, in one embodiment, the most suitable location should remain the closest location as possible to the application $202_2$, when possible.

In some embodiments, the offload service 100 could allow an application 202 to manage, provision, and communicate with the specific P4 network resources 204 allocated to its application-specific offload service logic implementations. As an application-specific offload service logic implementation is deployed, new APIs can be generated by the offload service 100 to manage and provision that specific logic implementation. For example, the APIs could be generated to populate the table entries used by the application's logic. P4 technology assumes that the compilation of a P4 program produces two main artifacts (1) a data plane configuration that implements the forwarding logic of the P4 program and (2) an API for managing the state of the data plane objects from the control plane.

As the offload service 100 is expected to provide the required logic implementations on each P4 target to access each application-specific offload service logic implementation, offload service 100 can provide the required proxy functions to allow each application 202 to remotely access those allocated P4 network resources 204. The interfaces between the P4 pipeline and the offload service 100 can be implemented using a proprietary solution or optionally be automatically generated by the offload service 100 using P4 runtime technology. As discussed above, the interfaces to the proxy service can be part of the application-specific offload service enablers 116.

In some embodiments, multiple instances of the offload service 100 can be available on the network infrastructure, assuming each offload service 100 would be managing different P4 network resources 204 or at least different slices of the network infrastructure. For example, each offload service 100 could have its own visibility of the network infrastructure, in which case different applications 202 might be requested to use different instances of the offload service 100.

Considering the case where the offload service 100 would not be available on the deployed system or the case where the offload service 100 could not allocate any P4 network resources 204 to an application 202, applications 202 can assume that their application-specific packet processing offload logic implementation could not be provided by the offload service 100. That assumes that applications 202 should always remain capable of fully processing their entire packet processing logic to account for the case where the offload service 100 cannot enforce their requests.

Accordingly, applications 202 can implement some means that could confirm whether packets have gone through their intended application-specific packet offload logic implementation once they reached the application 202 itself (i.e., a proof of work). For example, in the case where an application-specific packet offload logic implementation would add a pre-pended header, the proof of work could be the presence of the pre-pended header itself.

Figure 9A:
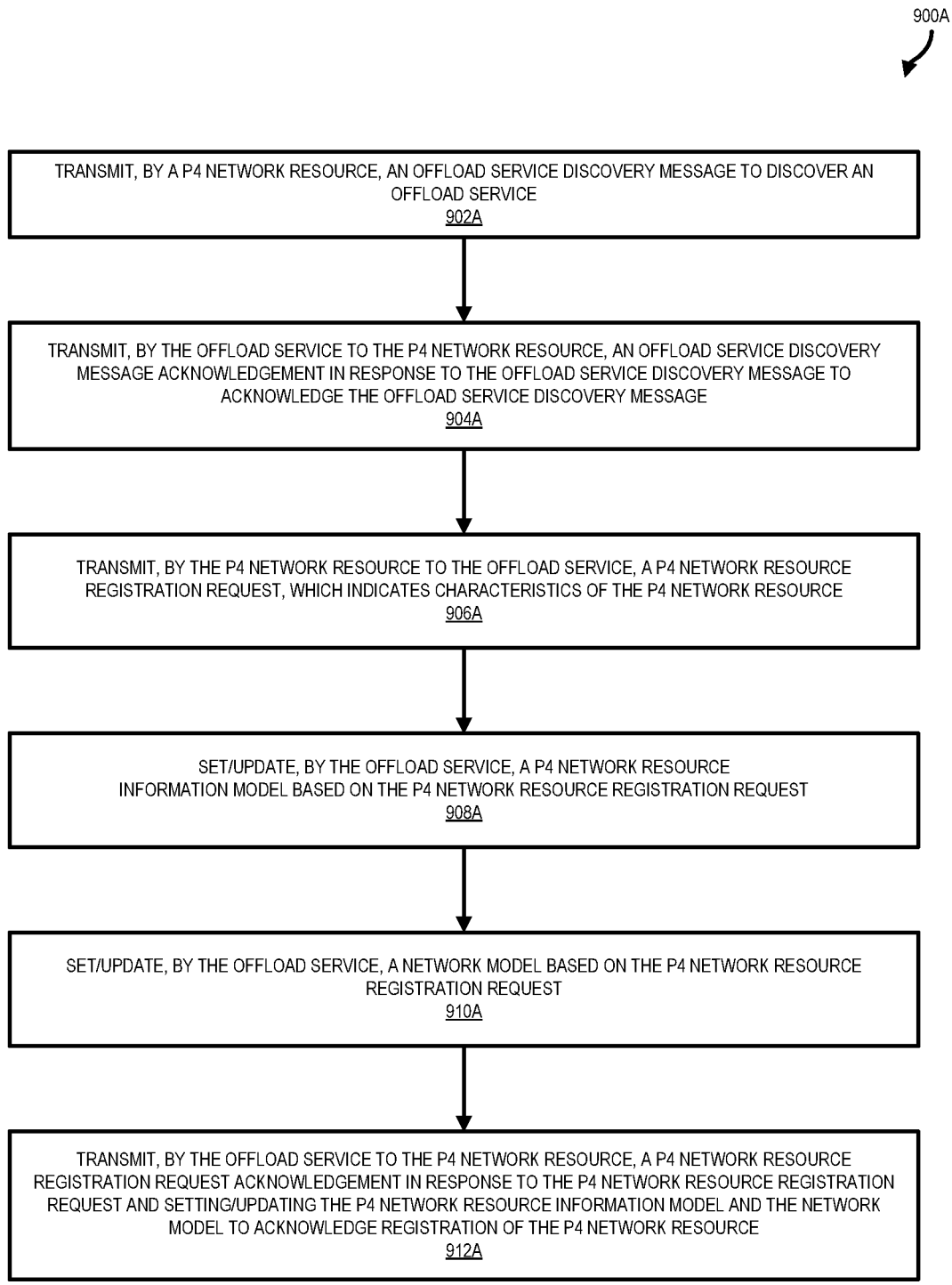
FIG. 9A shows a method for a P4 network resource to register with the offload service, according to one example embodiment.

Turning now to FIG. 9A, a method 900A will be described for a P4 network resource 204 to register with the offload service 100, according to one example embodiment. The operations in the flow diagram will be described with reference to the exemplary embodiments of the other figures. However, it should be understood that the operations of the flow diagram can be performed by embodiments of the invention other than those discussed with reference to the other figures, and the embodiments of the invention discussed with reference to these other figures can perform operations different than those discussed with reference to the flow diagrams. The method 900A will be described in relation to the data flow diagram 900B of FIG. 9B in which the P4 network resource $204_1$ registers with the offload service 100. In other embodiments, other P4 network resources 204 can also register with the offload service 100 using the method 900A.

As shown in FIG. 9A, the method 900A may commence at operation 902A with the P4 network resource $204_1$ transmitting an offload service discovery message 902B to discover the offload service 100. In particular, the offload service discovery message 902B may be a multicast or broadcast message or the P4 network resource $204_1$ may have been statically configured to transmit the offload service discovery message 902B to a particular address and/or port associated with the offload service 100. Accordingly, the offload service 100 may detect/receive the offload service discovery message 902B.

At operation 904A, the offload service 100 transmits an offload service discovery message acknowledgement 904B to the P4 network resource $204_1$ in response to the offload service discovery message 902B. Accordingly, the P4 network resource $204_1$ may receive the offload service discovery message acknowledgement 904B to indicate receipt of the offload service discovery message 902B and consequently the presence of the offload service 100.

At operation 906A, the P4 network resource $204_1$ transmits a P4 network resource registration request 906B to the offload service 100, which was discovered based on the operations 902A and 904A. The P4 network resource registration request 906B may indicate various characteristics associated with the P4 network resource $204_1$, including an architecture of the P4 network resource $204_1$, available resources of the P4 network resource $204_1$ (e.g., processing and memory resources), and/or a compiler associated with the architecture of the P4 network resource $204_1$ for compiling P4 code to be offloaded by an application 202 on the P4 network resource $204_1$.

At operation 908A, the offload service 100 sets/updates a P4 network resource information model 908B based on the P4 network resource registration request 906B received from the P4 network resource $204_1$. In particular, the offload service 100 indicates characteristics of the P4 network resource $204_1$ in the P4 resource information 106 based on the P4 network resource registration request 906B.

At operation 910A, the offload service sets/updates a network model 910B based on the P4 network resource registration request 906B received from the P4 network resource $204_1$. In particular, the offload service 100 updates the network topology information/model 104 to include links between the P4 network resource $204_1$ and other elements of the network infrastructure based on the P4 network resource registration request 906B.

At operation 912A, the offload service 100 transmits a P4 network resource registration request acknowledgement 912B to the P4 network resource $204_1$ to indicate that the P4 network resource $204_1$ has been registered with the offload service 100. Accordingly, upon receipt of the P4 network resource registration request acknowledgement 912B, the P4 network resource $204_1$ can now expect to potentially receive offload requests for processing network data on behalf of a remote application 202.

Figure 10A:
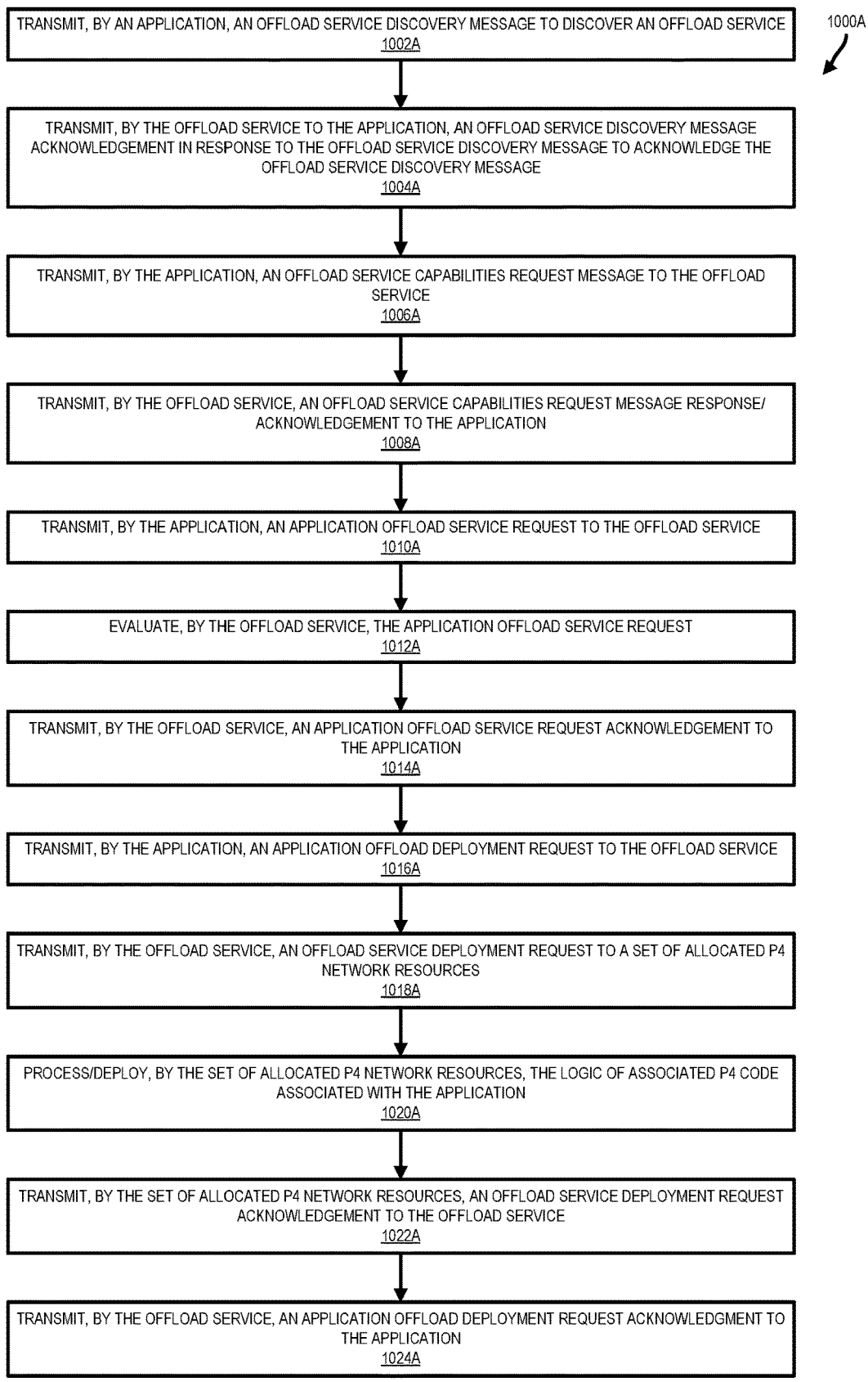
FIG. 10A shows a method for an application to register with the offload service, according to one example embodiment.
Figure 10B:
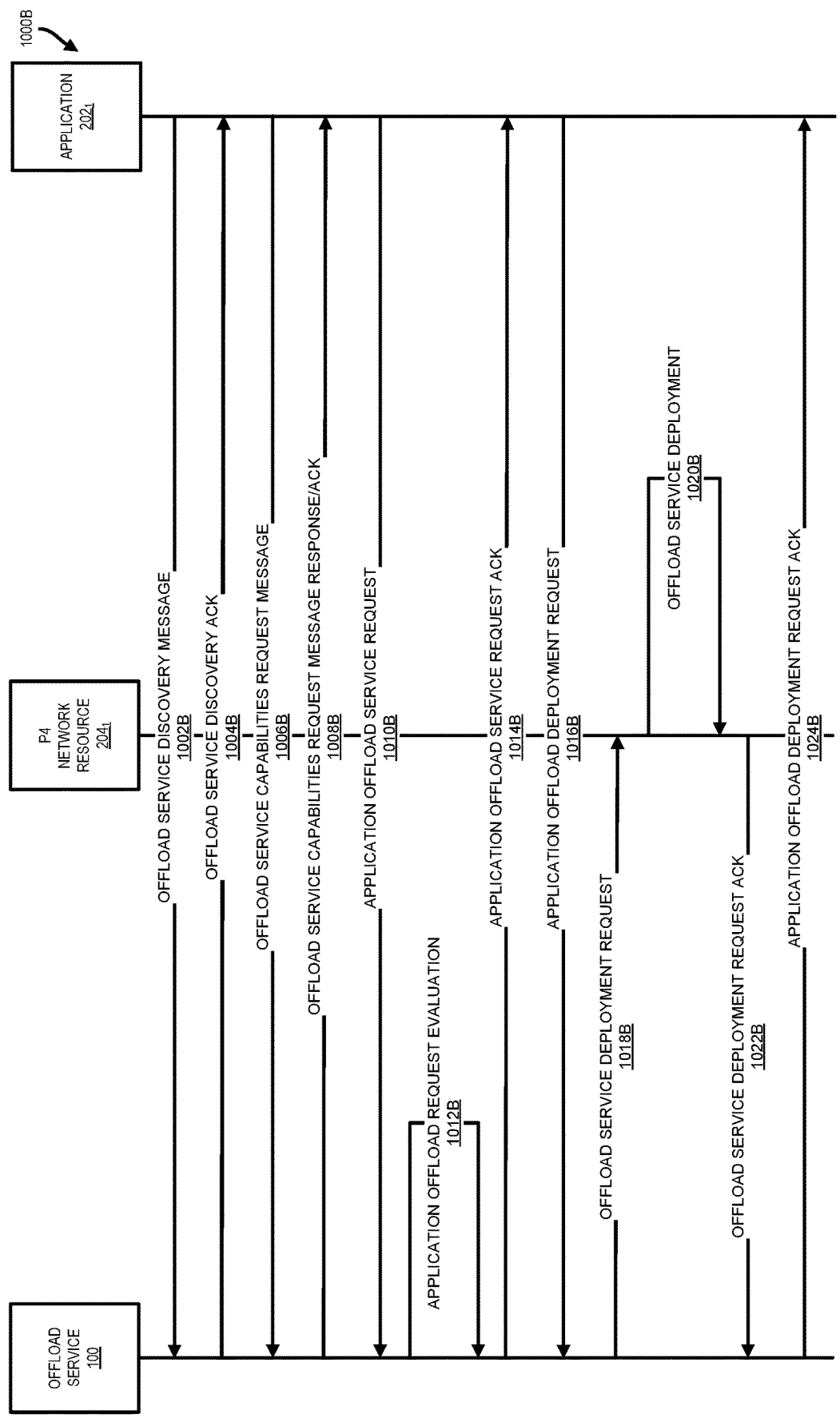
FIG. 10B shows a data flow diagram for an application to register with the offload service, according to one example embodiment.

FIG. 10A shows a method 1000A for an application 202 to register with the offload service 100, according to one example embodiment. The operations in the flow diagram will be described with reference to the exemplary embodiments of the other figures. However, it should be understood that the operations of the flow diagram can be performed by embodiments of the invention other than those discussed with reference to the other figures, and the embodiments of the invention discussed with reference to these other figures can perform operations different than those discussed with reference to the flow diagrams. The method 1000A will be described in relation to the data flow diagram 1000B of FIG. 10B in which the application $202_1$ registers with the offload service 100. In other embodiments, other applications 202 can also register with the offload service 100.

As shown in FIG. 10A, the method 1000A may commence at operation 1002A with the application $202_1$ transmitting an offload service discovery message 1002B to discover the offload service 100. In particular, the offload service discovery message 1002B may be a multicast or broadcast message or the application $202_1$ may have been statically configured to transmit the offload service discovery message 1002B to a particular address and/or port associated with the offload service 100. Accordingly, the offload service 100 may detect/receive the offload service discovery message 1002B.

At operation 1004A, the offload service 100 transmits an offload service discovery message acknowledgement 1004B to the application $202_1$ in response to the offload service discovery message 1002B. Accordingly, the application $202_1$ may receive the offload service discovery message acknowledgement 1004B to indicate receipt of the offload service discovery message 1002B and consequently the presence of the offload service 100.

At operation 1006A, the application $202_1$ transmits an offload service capabilities request message 1006B to the offload service 100. The offload service capabilities request message 1006B requests information from the offload service 100 regarding capabilities of the offload service 100. In particular, the application $202_1$ requests capabilities of P4 network resources 204 that are available to the offload service 100 such that the offload service 100 can make these P4 network resources 204 available to the application 202₁.

At operation 1008A, the offload service 100 transmits an offload service capabilities request message response/acknowledgement 1008B to the application 202₁. The offload service capabilities request message response/acknowledgement 1008B indicates the capabilities of the offload service 100, including processing power, memory capacity, and/or architectures of various P4 network resources 204 registered with the offload service 100. For example, the offload service 100 could indicate one or more P4 architectures to a developer of the application 202₁ such that the developer is enabled to write their own P4 programs specifying their needs in terms of packet processing offload. In some embodiments, the offload service 100 could also suggest application-specific offload implementations or offload service templates 110 to the application 202₁. More specifically, via the offload service capabilities request message response/acknowledgement 1008B, the offload service 100 could provide a number of application-specific implementations/templates that could be considered as fulfilling common needs to many different applications 202. In which case, an application-specific implementation/template can be instantiated for the application 202₁ based on the needs of the application 202₁ and inputs/parameters provided by the developer to produce P4 program code that fulfill the offload logic of the application 202₁.

At operation 1010A, the application 202₁ transmits an application offload service request 1010B to the offload service 100. The application offload service request 1010B indicates the desired operations/services to be offloaded to a P4 network resource 204. For example, the application offload service request 1010B can include an indication of an application-specific implementation/template that will be instantiated by the offload service 100 on behalf of the application 202₁ and/or a set of processing/memory requirements and a set of parameters.

At operation 1012A, the application offload service request 1010B is evaluated 1012B by the offload service 100. In particular, when an offload service 100 is received, the offload service 100 performs an analysis to validate the application offload service request 1010B and determine the most suitable P4 network resource(s) 204 that could be allocated for the requested application-specific implementation/template.

At operation 1014A, the offload service 100 transmits an application offload service request acknowledgement 1014B to the application 202₁. In particular, the offload service 100 indicates to the application 202₁ via the application offload service request acknowledgement 1014B whether a set of P4 network resources 204 were located for hosting associated logic for the application 202₁ and submitted P4 program code is properly adapted to the requirements of the allocated P4 network resource 204.

At operation 1016A, the application 202₁ transmits an application offload deployment request 1016B to the offload service 100. In particular, in response to the application 202₁ receiving an application offload service request acknowledgement 1014B that indicates that the offload service 100 has located a proper location for hosting associated logic for the application 202₁ and submitted P4 program code is properly adapted to the requirements of the allocated P4 network resource 204, then the application 202₁ submits an application offload deployment request 1016B to the offload service 100 to commence offloading operations.

At operation 1018A, the offload service 100 transmits an offload service deployment request 1018B to a set of allocated P4 network resources 204. In particular, in response to the application offload deployment request 1016B, the offload service 100 transmits an offload service deployment request 1018B to a set of allocated P4 network resources 204, which includes an application-specific implementation that implements the logic of associated P4 program code for processing by the set of allocated P4 network resources 204 such that the set of allocated P4 network resources 204 can process/deploy 1020B the logic of associated P4 code at operation 1020A.

At operation 1022A, the set of allocated P4 network resources 204 transmits an offload service deployment request acknowledgement 1022B to the offload service 100 to confirm deployment of the application-specific implementation/template.

At operation 1024A, the offload service 100 transmits an application offload deployment request acknowledgment 1024B to the application 202₁ to confirm deployment of the application-specific implementation/template.

Figure 11A:
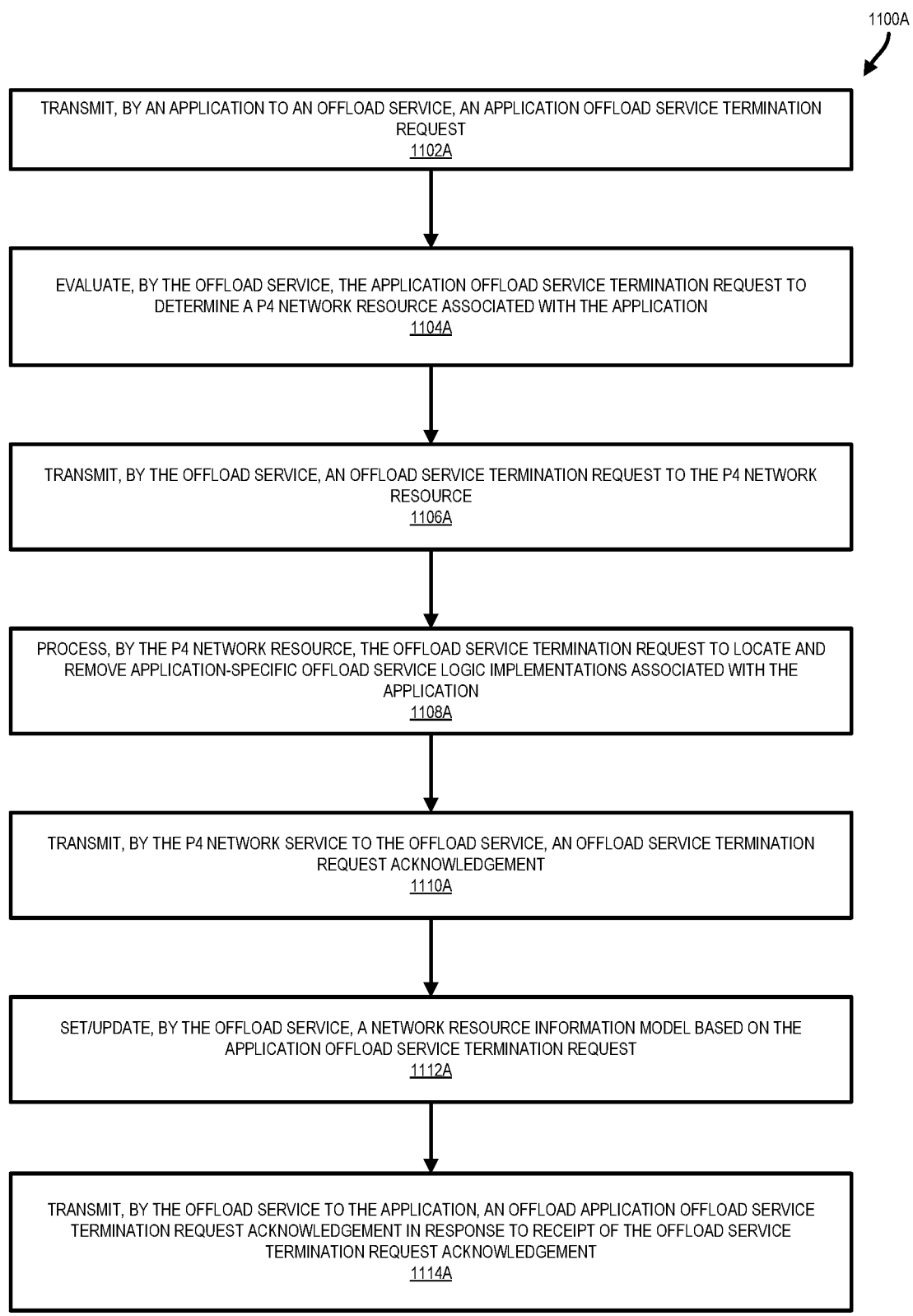
FIG. 11A shows a method for an application to terminate/deregister with the offload service, according to one example embodiment.

FIG. 11A shows a method 1100A for an application 202 to terminate/deregister with the offload service 100, according to one example embodiment. The operations in the flow diagram will be described with reference to the exemplary embodiments of the other figures. However, it should be understood that the operations of the flow diagram can be performed by embodiments of the invention other than those discussed with reference to the other figures, and the embodiments of the invention discussed with reference to these other figures can perform operations different than those discussed with reference to the flow diagrams. The method 1100A will be described in relation to the data flow diagram 1100B of FIG. 11B in which the application 202₁ deregisters with the offload service 100. In other embodiments, other applications 202 can also deregister with the offload service 100 such that the offload service 100 removes application-specific offload service logic implementations from corresponding P4 network resources 204 where they were deployed, if any.

Figure 11B:
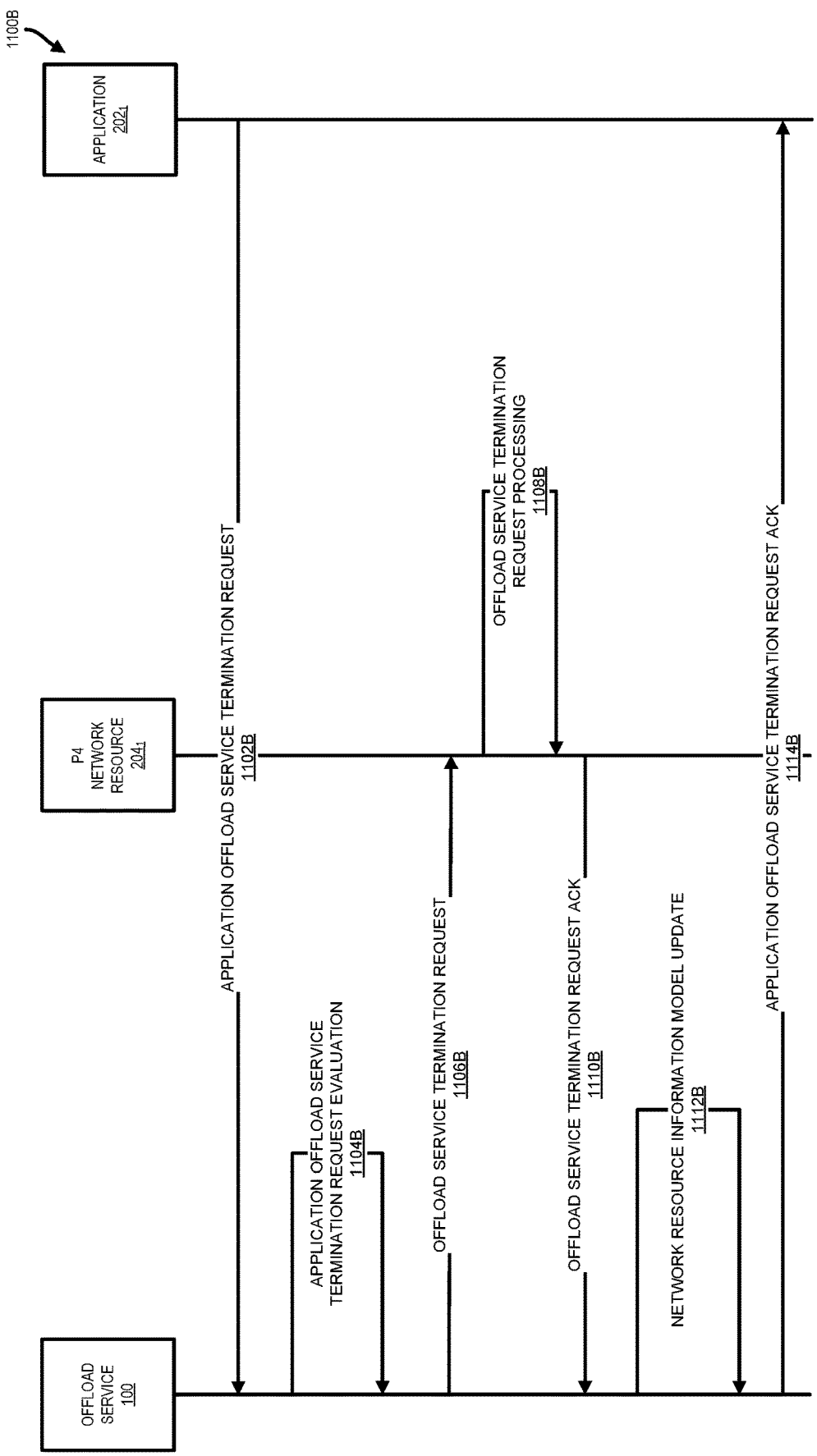
FIG. 11B shows a data flow diagram for an application to terminate/deregister with the offload service, according to one example embodiment.

As shown in FIG. 11A and FIG. 11B, the method 1100A may commence at operation 1102A with the application 202₁ transmitting an application offload service termination request 1102B to the offload service 100. The application offload service termination request 1102B requests the offload service 100 to deregister the application 202₁ such that the offload service 100 removes application-specific offload service logic implementations from corresponding P4 network resources 204.

At operation 1104A, the offload service 100 evaluates 1104B the application offload service termination request 1102B. In particular, the offload service 100 determines which P4 network resources 204 are associated/allocated to the application 202₁. For purposes of illustration, the method 1100A will be described in relation to the offload service 100 determining that the P4 network resource 204₁ is associated/allocated to the application 202₁ at operation 1104A.

At operation 1106A, the offload service 100 transmits an offload service termination request 1106B to the P4 network resources 204 determined at operation 1104A. Namely, the offload service 100 transmits an offload service termination request 1106B to the P4 network resource 204₁ at operation 1106A.

At operation 1108A, the P4 network resource 204₁ processes 1108B the offload service termination request 1106B. In particular, the P4 network resource 204₁ locates and removes application-specific offload service logic implementations associated with the application $202_1$ at operation 1108A.

At operation 1110A, the P4 network resource $204_1$ transmits an offload service termination request acknowledgement 1110B to the offload service 100. The offload service termination request acknowledgement 1110B indicates that the offload service termination request 1106B was received and successfully processed by the P4 network resource $204_1$ to remove application-specific offload service logic implementations associated with the application $202_1$.

At operation 1112A, the offload service 100 sets/updates 1112B a network resource information model based on the offload service termination request 1106B. Namely, the offload service 100 removes the association between the application $202_1$ and the P4 network resource $204_1$ in response to the offload service termination request acknowledgement 1110B and based on the offload service termination request 1106B.

At operation 1114A, the offload service 100 transmits an application offload service termination request acknowledgement 1114B to the application $202_1$ in response to receipt of the offload service termination request acknowledgement 1110B. The application offload service termination request acknowledgement 1114B indicates that the application offload service termination request 1102B was received and successfully processed by the offload service 100 and the P4 network resource $204_1$ to remove application-specific offload service logic implementations associated with the application $202_1$.

Figure 12A:
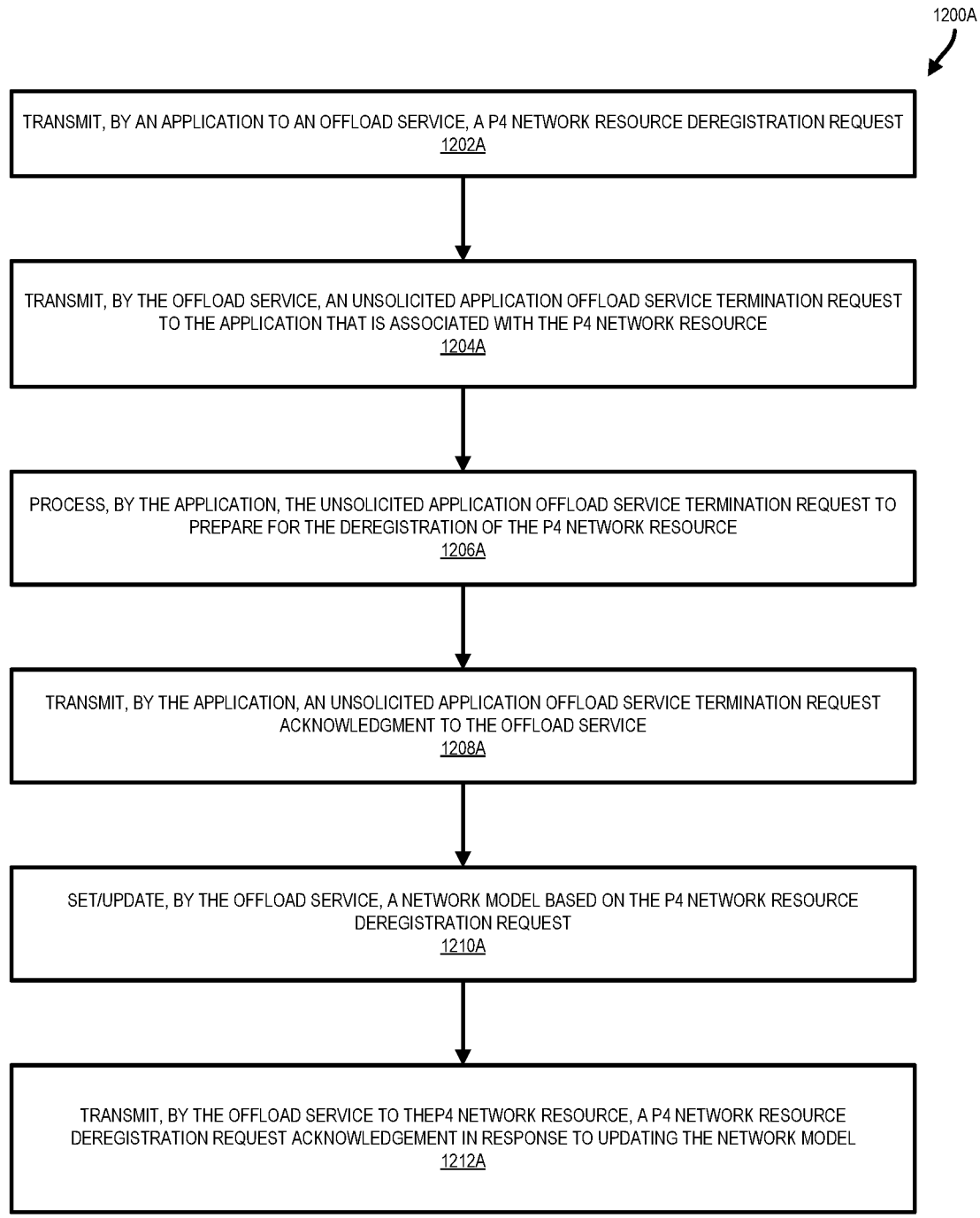
FIG. 12A shows a method for a P4 network resource to terminate/deregister with the offload service, according to one example embodiment.

FIG. 12A shows a method 1200A for a P4 network resource 204 to terminate/deregister with the offload service 100, according to one example embodiment. The operations in the flow diagram will be described with reference to the exemplary embodiments of the other figures. However, it should be understood that the operations of the flow diagram can be performed by embodiments of the invention other than those discussed with reference to the other figures, and the embodiments of the invention discussed with reference to these other figures can perform operations different than those discussed with reference to the flow diagrams. The method 1200A will be described in relation to the data flow diagram 1200B of FIG. 12B in which the P4 network resource $204_1$ deregisters with the offload service 100. In other embodiments, other P4 network resources 204 can also deregister with the offload service 100 such that the offload service 100 removes application-specific offload service logic implementations from the corresponding P4 network resources 204 where they were deployed.

Figure 12B:
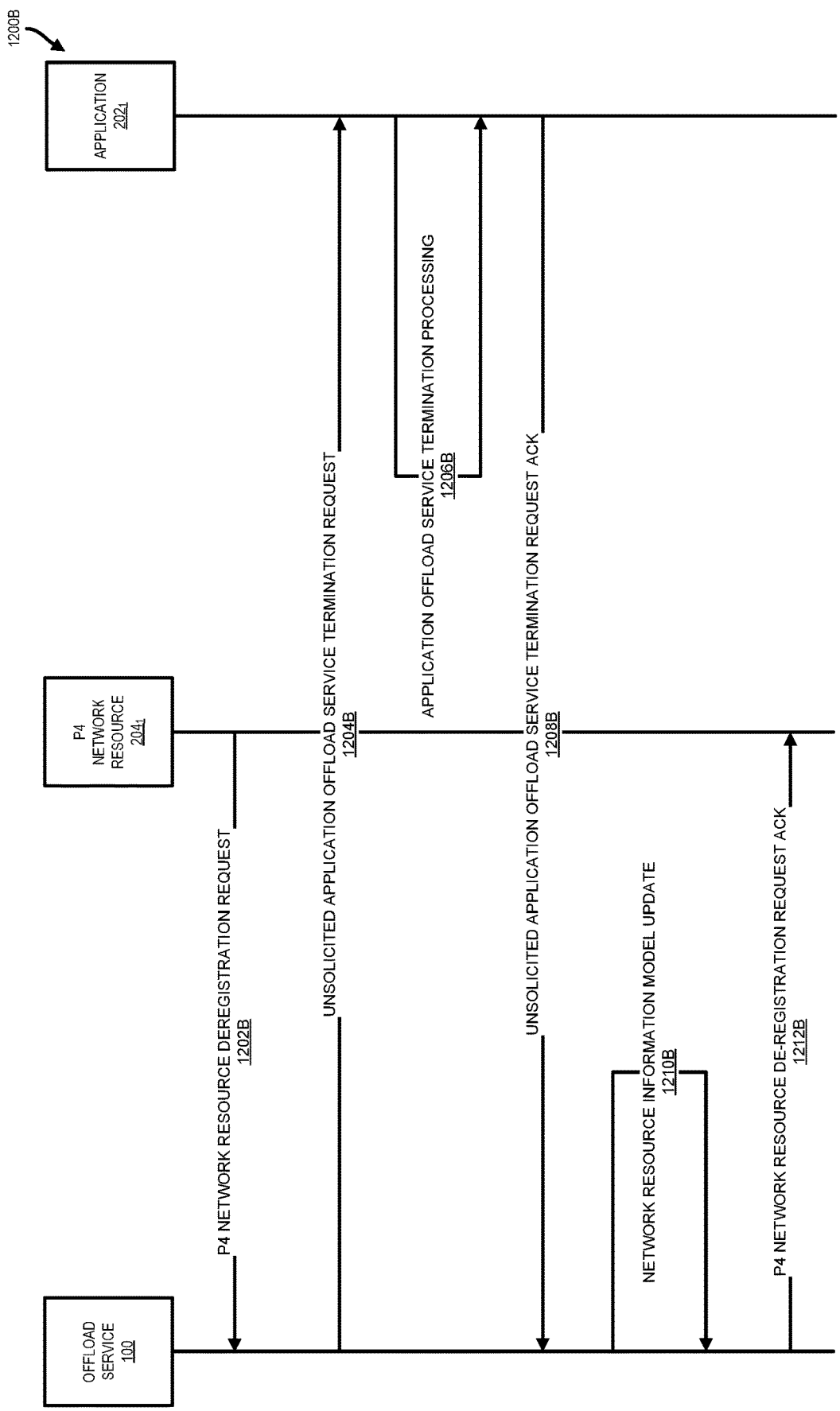
FIG. 12B shows a data flow diagram for a P4 network resource to terminate/deregister with the offload service, according to one example embodiment.

As shown in FIG. 12A and FIG. 12B, the method 1200A may commence at operation 1202A with the P4 network resource $204_1$ transmitting a P4 network resource deregistration request 1202B to the offload service 100. The P4 network resource deregistration request 1202B requests the offload service 100 to deregister the P4 network resource $204_1$ such that the offload service 100 removes application-specific offload service logic implementations from the P4 network resource $204_1$.

At operation 1204A, the offload service 100 transmits an unsolicited application offload service termination request 1204B to the applications 202 that are associated with the P4 network resource $204_1$. In particular, the offload service 100 transmits the unsolicited application offload service termination request 1204B to any applications 202 that the P4 network resource $204_1$ is running application-specific offload service logic implementations. For purposes of explanation, the offload service 100 transmits the unsolicited application offload service termination request 1204B to the application $202_1$ at operation 1204A.

At operation 1206A, the application $202_1$ processes 1206B the unsolicited application offload service termination request 1204B. Namely, the application $202_1$ performs a compensation/handover procedure to account for the application-specific offload service logic implementations of the application $202_1$ no longer being processed by the P4 network resource $204_1$.

At operation 1208A, the application $202_1$ transmits an unsolicited application offload service termination request acknowledgement 1208B to the offload service 100. The unsolicited application offload service termination request acknowledgement 1208B indicates that the unsolicited application offload service termination request 1204B was received by the application $202_1$ and successfully processed.

At operation 1210A, the offload service 100 updates the network resource information model 1210B in response to receipt of the unsolicited application offload service termination request 1204B. Namely, the offload service 100 updates the network model to indicate that the P4 network resource $204_1$ is no longer available.

At operation 1212A, the offload service 100 transmits a P4 network resource deregistration request acknowledgement 1212B to the P4 network resource $204_1$. The P4 network resource deregistration request acknowledgement 1212B indicates that the P4 network resource deregistration request 1202B was received and processed such that the P4 network resource $204_1$ is removed from the network resource information model 1210B and is no longer available for offloading allocation by the offload service 100.

Figure 13:
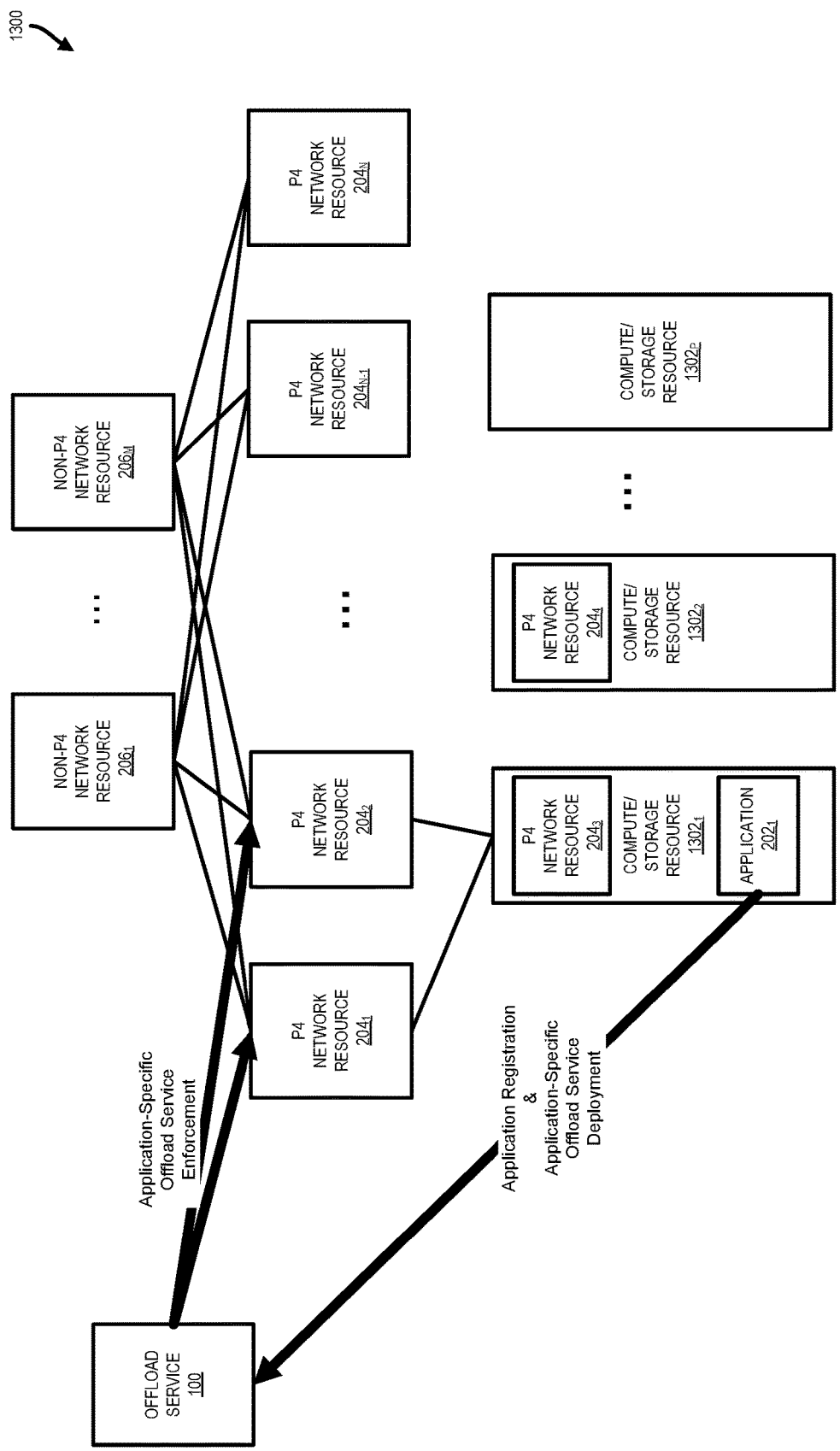
FIG. 13 shows an example where an application utilizes a set of P4 network resources for packet parsing and header validation, according to one example embodiment.

Turning now to FIG. 13, an example will be described where an application 202 utilizes a set of P4 network resources 204 for packet parsing and header validation. In particular, packet parsing and header validation could be considered recurrent processing overhead that remains essential but might represent a relatively heavy burden for the application 202. Such tasks could potentially be performed more efficiently by other system components (e.g., P4 network resources 204) on behalf of the application 202.

In this use case, it is assumed that the application 202 specifies their packet parsing and header validation processing requirements leveraging on the P4 technology, submitting their offload service specifications and P4-based service logic implementations to the offload service 100. The offload service 100 would be responsible for validating and evaluating the offload service request from the application 202, as well as for orchestrating the deployment and proper enforcement of the requested offload capabilities.

Upon an application request to the offload service 100 for offloading some of its specific packet processing logic, it could be determined by the offload service 100 that the delegated tasks would be performed more efficiently at certain strategic location(s) within the system infrastructure domain, potentially being performed by specialized software and/or hardware components for increased performance.

As shown in FIG. 13, once application developers have developed and tested their application-specific packet processing offload logic implementation, the corresponding application 202 makes a request to the offload service 100 to deploy it on the most appropriate P4 network resources 204 of the associated network infrastructure. In this example, application $202_1$ sends a request to the offload service 100. Along with the request, application $202_1$ sends the corresponding P4 program code that implements its requested application-specific offload service logic with the application-specific offload service configuration parameters. When receiving the application offload service request, the offload service 100 validates and evaluates the request. Assuming the provided P4 program code is considered valid and that the request fulfills the terms of the corresponding SLA with the offload service 100, the offload service 100 determines that the application-specific packet processing offload logic implementation can be deployed on the P4 network resources $204_1$ and $204_2$, which are directly connected to the compute/storage resource $1302_1$ from the set of compute/storage resources $1302_1$-$1302_P$ where the application $202_1$ is running. In FIG. 13, the application-specific offload service enforcement corresponds to offload service 100 installing the application-specific packet processing offload logic implementation on the P4 network resources $204_1$ and $204_2$.

Figure 14:
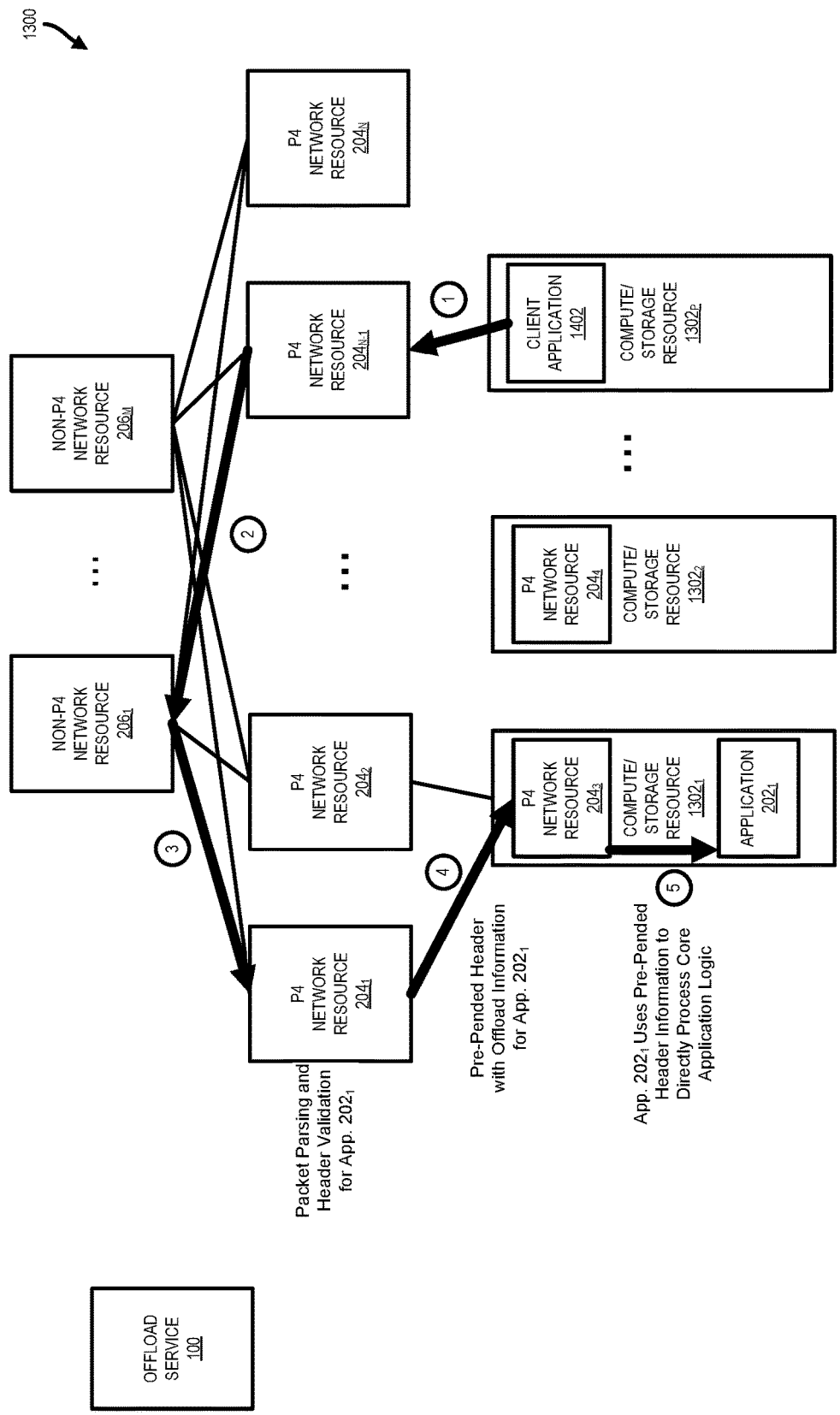
FIG. 14 shows another example where an application utilizes a set of P4 network resources for packet parsing and header validation, according to one example embodiment.

Turning to FIG. 14, as shown in this figure, the application $202_1$ has requested to pre-process packets destined to it. As packets are sent from the client application 1402, the packets traverse the network infrastructure until they reach one of the P4 network resources 204 directly connected to the compute/storage resource $1302_1$ where the application $202_1$ is running. In this case, it is the P4 network resource $204_1$.

As mentioned earlier, the application $202_1$ has requested to offload some of its packet parsing and header validation tasks. For example, all packets destined to application $202_1$ would be validated for correctness and/or filtered according to some application-specific rules before reaching the application $202_1$ itself. That implies that each packet would be inspected more or less deeply, which assumes that a certain number of packet headers would be at least parsed and validated.

While an application-specific packet processing offload logic implementation could remain limited to packet header validation, the example shown in FIG. 14 suggests to also provide additional information to the application $202_1$. For example, additional information could be provided through a pre-pended packet header, which would be added by the application-specific offload service implementation. The information contained in that pre-pended header could be considered by the application $202_1$ has information already parsed by its offload functions, with the intention to make more efficient decisions within the application $202_1$ itself. The information could also represent information obtained from the data model associated with the application-specific offload service implementation, and based on packet header information, on existing service flows or on network data analytics. This example assumes that the application $202_1$ would use that pre-pended header information to jump faster into the core logic of the application $202_1$, instead of having to perform a deeper packet parsing operation and making a number of header validation and table lookups, before starting the execution of the core logic of the application $202_1$.

While this type of offload function for packet parsing and header validation could be considered very useful for Virtual Network Function (VNF) applications to minimize their recurrent packet header overhead, a number of other offload functions could be envisioned, such as functions that would provide application-specific load balancing functionality, or functions providing application-specific routing, switching, service chaining or many other types of packet processing.

Figure 15:
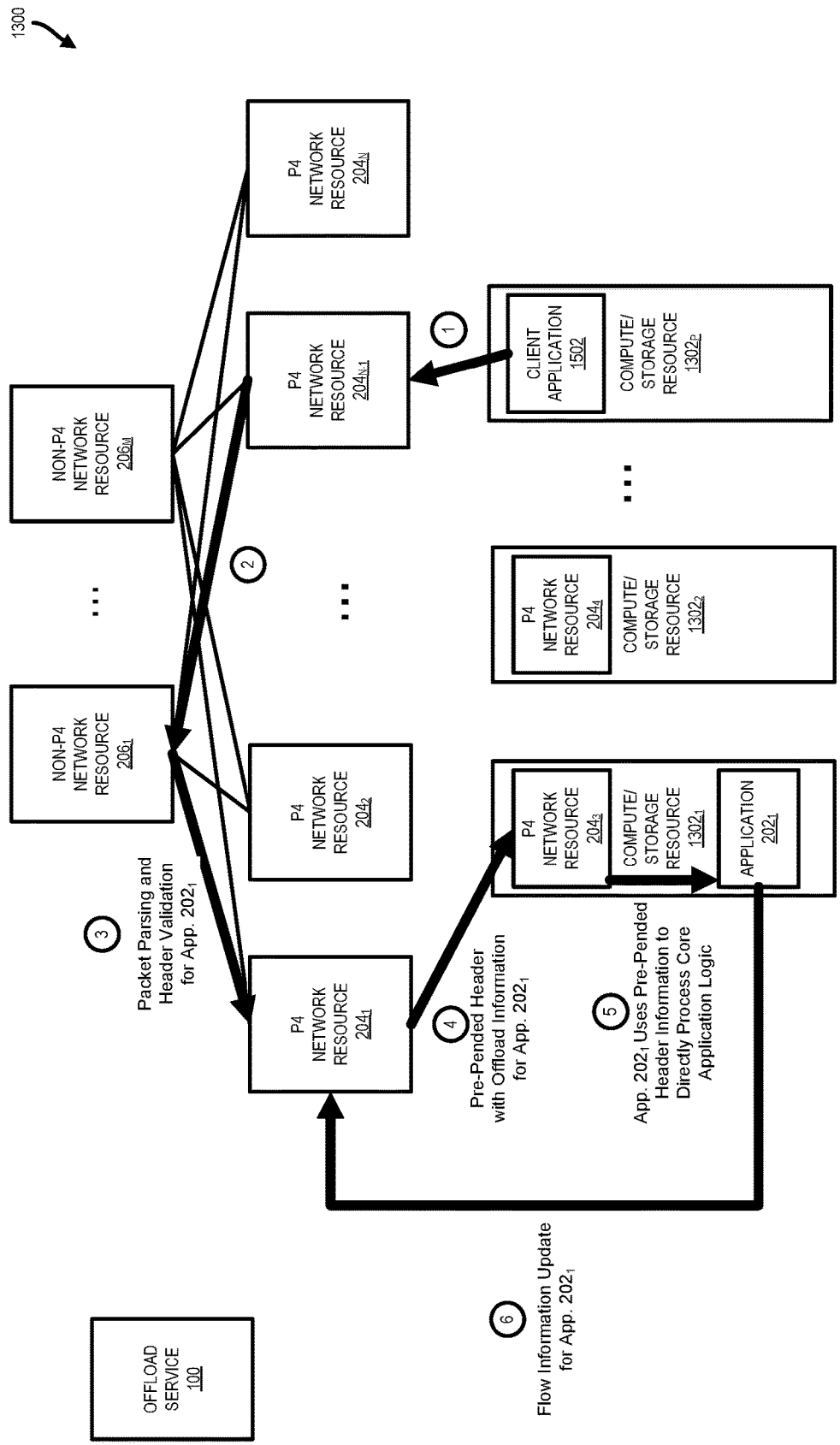
FIG. 15 shows yet another example where an application utilizes a set of P4 network resources for packet parsing and header validation, according to one example embodiment.

Turning now to FIG. 15, a use case will be described where an application 202 can dynamically manage table entries of its application-specific offload service implementation deployed on a P4 network resource 204. As shown in FIG. 15, packets are sent from the client application 1502 to the application $202_1$. Assuming the application-specific offload service implementation is deployed on the left P4 network resource $204_1$ that is directly connected to the compute/storage resource $1302_1$, packets destined to application $202_1$ are pre-processed specifically to identify an existing service flow. When a packet sent to the application $202_1$ is not associated to any existing service flow, the packet is sent to application $202_1$ on compute/storage resource $1302_1$. Further, a pre-pended header can be added to each packet destined to application $202_1$.

When a packet is received by the application $202_1$, information could be extracted from the pre-pended header, which could be used to identify that no service flow is currently associated with the packet. Additional information could also be provided in the pre-pended header, potentially helping the application $202_1$ to take a proper decision regarding the creation of a new service flow. In this example, the application $202_1$ could use network analytics information from the P4 network resource $204_1$ to allocate the newly created service flow to a new server. In some embodiments, the application $202_1$ updates table entries of its application-specific offload service implementation to create the service flow on the P4 network resource $204_1$. As mentioned earlier, applications 202 can optionally provision themselves the tables related to their application-specific offload service implementation.

In one embodiment, considering that the application $202_1$ has created a table entry for a new service flow in the application-specific offload service implementation deployed on the allocated P4 network resource $204_1$, the packets that were originally destined to application $202_1$ on the compute/storage resource $1302_1$, can now be re-directed towards the compute/storage resource $1302_2$ instead (i.e., packets matching the newly created service flow would now be redirected to compute/storage resource $1302_2$ instead of compute/storage resource $1302_1$ when the new service flow would require this). It could also be assumed that service flow information could be provided through the packet pre-pended header added by the application-specific offload service implementation on the P4 network resource $204_1$.

As described herein, the offload service 100 can be used by applications 202 to dynamically request certain application-specific packet processing logic implementations to be offloaded to P4 network resources 204 available on the associated network infrastructure domain. The offload service 100 has a holistic system view of system-wide P4 network resources 204, which allows the offload service 100 to learn the associated network topology as well as detailed information on all P4 network resources 204 available on that network infrastructure, such as their location, their supported P4 architectures, their characteristics, etc. That holistic system view enables the offload service 100 to find the most appropriate P4 network resource(s) 204 available to deploy an application-specific packet processing offload logic implementation, assuring the most efficient packet processing offload performance.

The offload service 204 provides application developers with offload service templates 110, which can be used by applications 202 to specify their packet processing offload requirements, which included offload service-specific deployment specifications. Also, as part of the selected offload service templates 110, applications 202 are provided with a P4 architecture, P4 libraries, and P4 program stubs that can be used by application developers to implement their own application-specific packet processing offload logic implementation. Once completed, the application-specific packet processing offload logic implementation is provided to the offload service 100 as a P4 program, which can be compiled and deployed by the offload service 100 to the most appropriate P4 network resource 204.

For application-specific packet processing offload logic implementations that define a data model for provisioning their packet offload logic, the offload service 100 allows applications 202 to manage and provision their own offload service logic implementations using a provisioning proxy provided by the offload service 100. Before deploying an application-specific packet processing offload logic implementation on P4 targets, the offload service 100 allows applications 202 to test their packet processing offload implementations in a test environment, which is meant to validate a proper application 202 integration with the offload service 100.

FIGS. 16A-16E show a method 1600 for offloading network operations of a first application $202_1$ to network resources 204 in a network system 1300, according to one example embodiment. The operations in the flow diagram will be described with reference to the exemplary embodiments of the other figures. However, it should be understood that the operations of the flow diagram can be performed by embodiments of the invention other than those discussed with reference to the other figures, and the embodiments of the invention discussed with reference to these other figures can perform operations different than those discussed with reference to the flow diagrams.

Figure 16A:
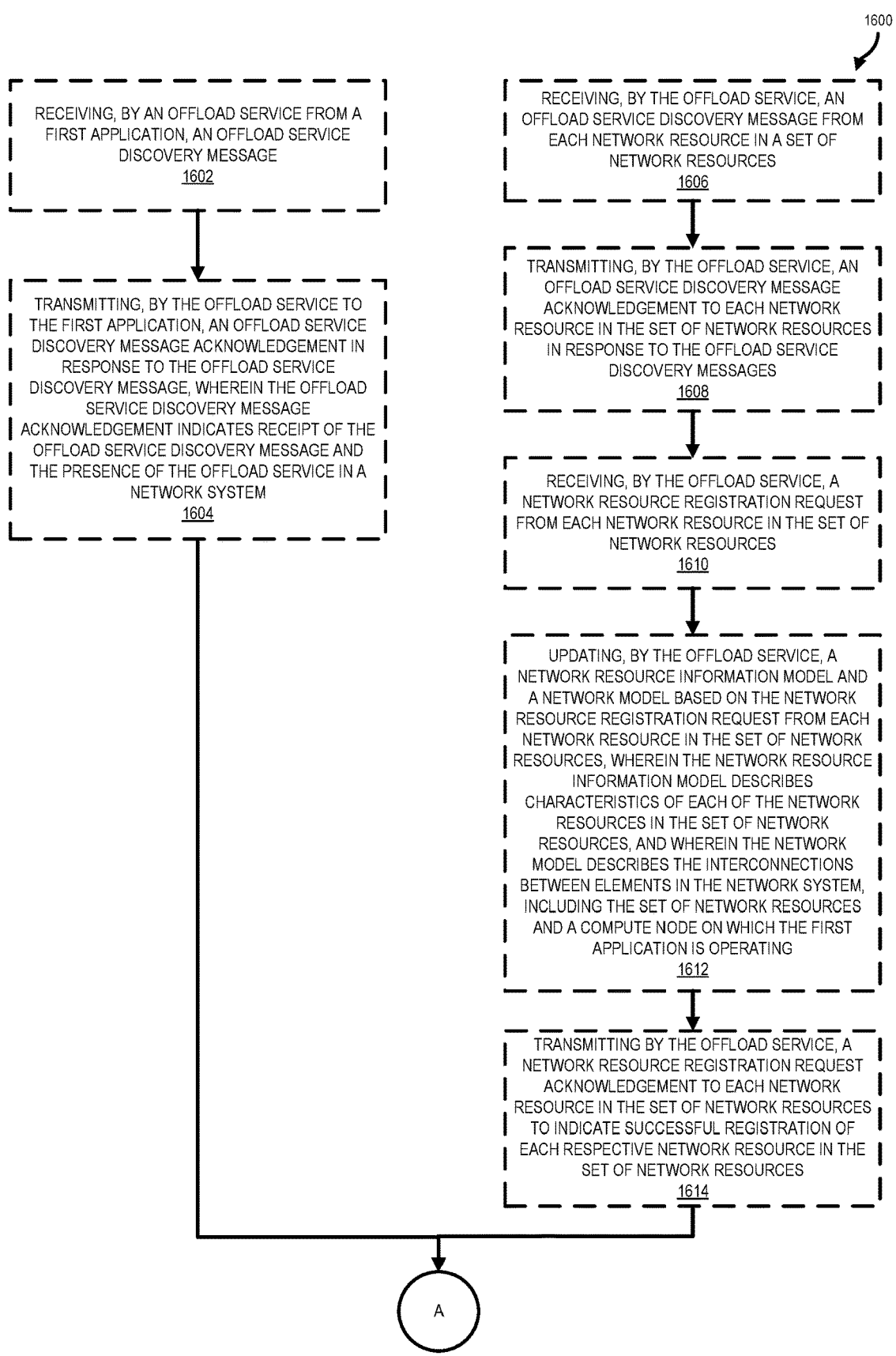
FIGS. 16A-16E show a method for offloading network operations of a first application to network resources in a network system, according to one example embodiment.
Figure 16B:
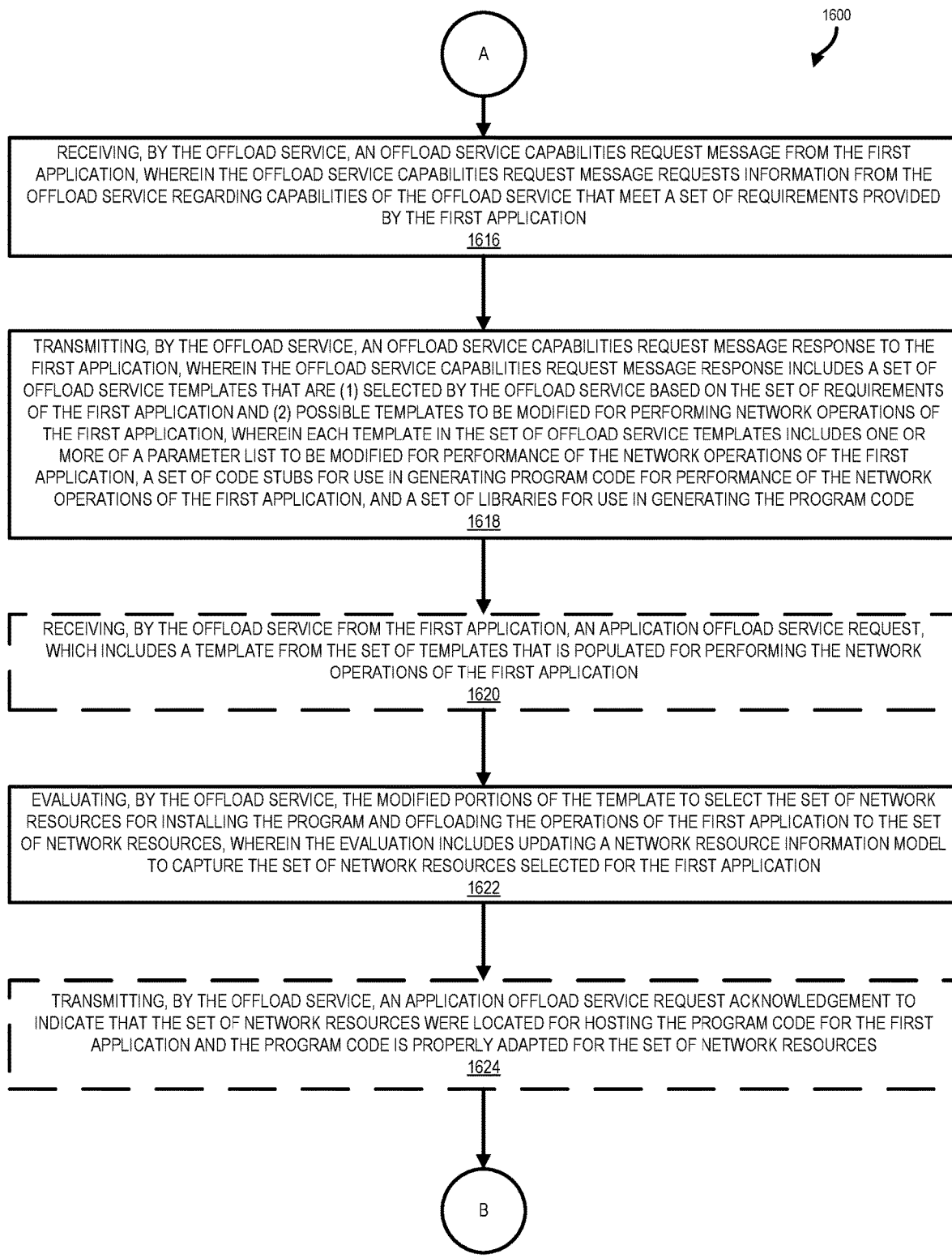
Figure 16C:
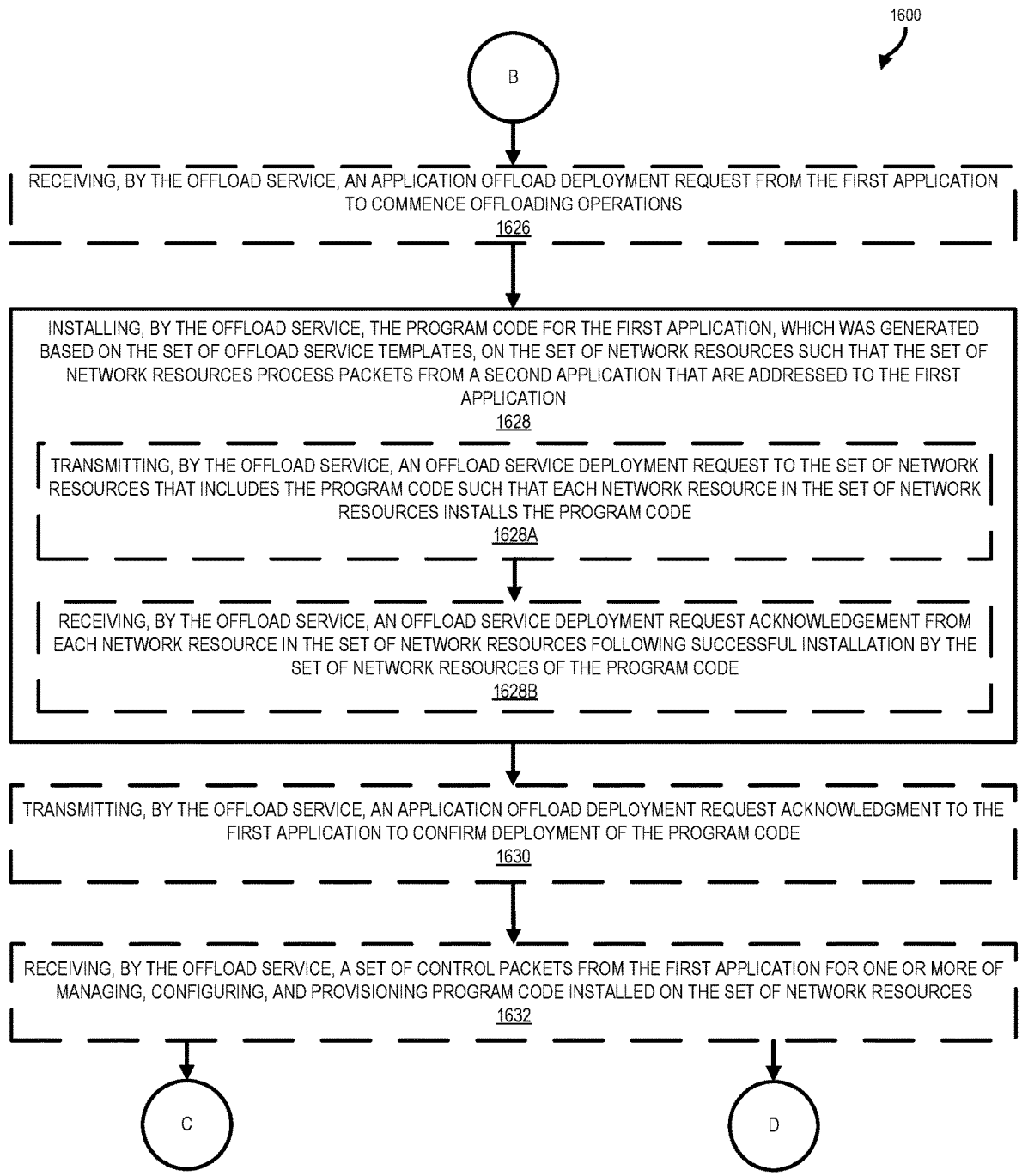
Figure 16D:
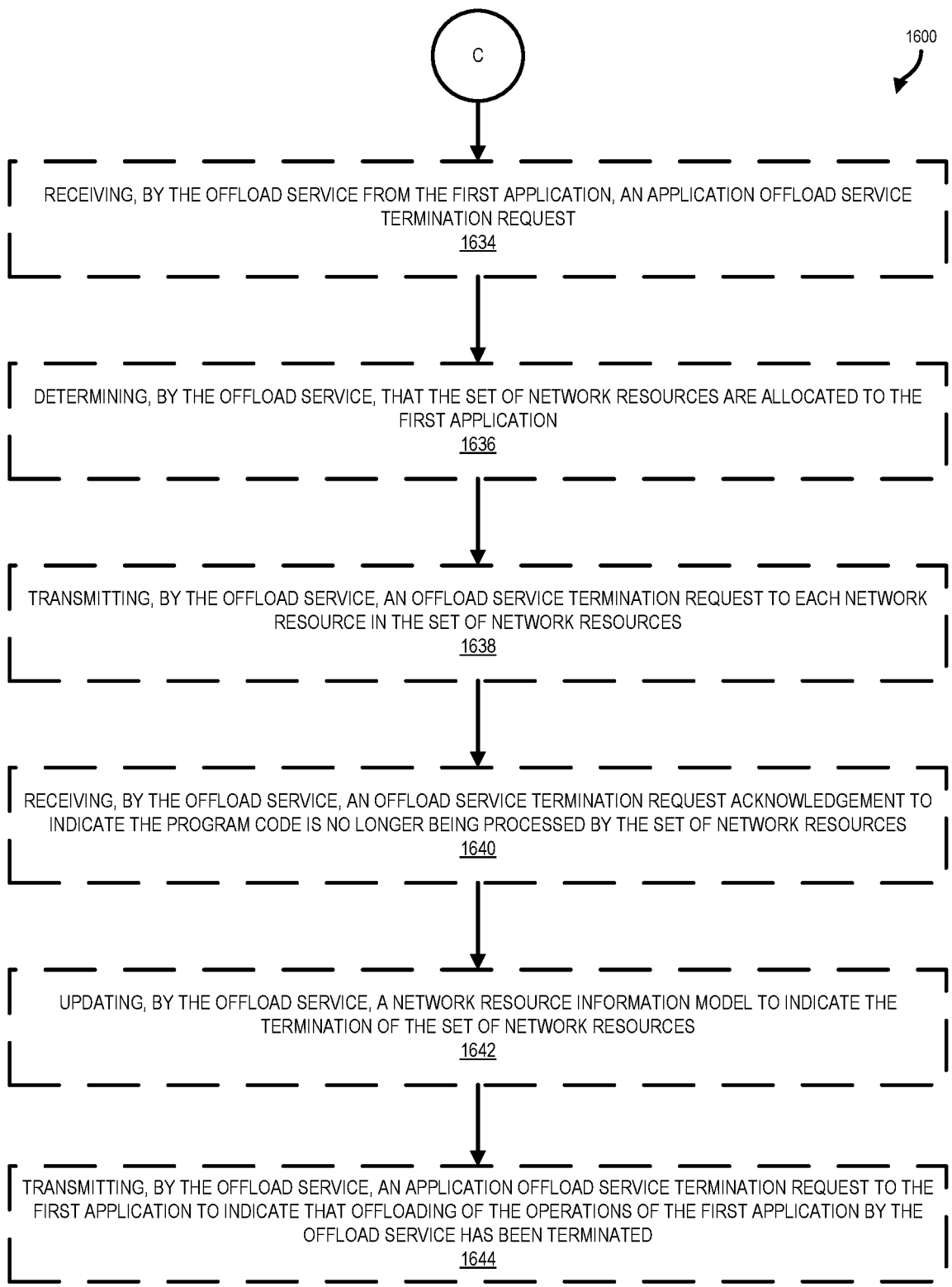
Figure 16E:
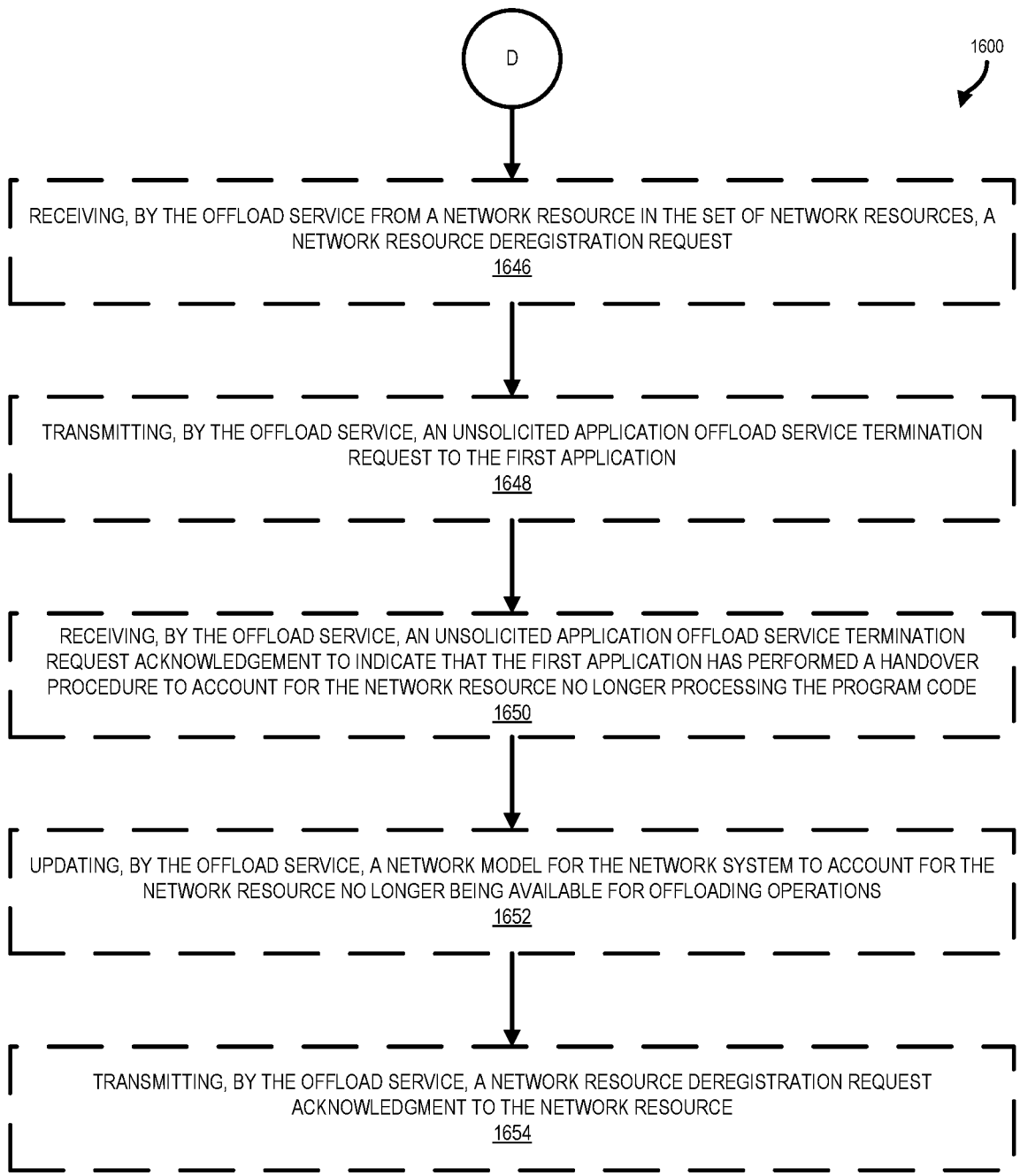

As shown in FIG. 16A, the method 1600 may commence at operation 1602 with the offload service 100 receiving from a first application $202_1$ an offload service discovery message 1002B.

At operation 1604 the offload service 100 transmits to the first application $202_1$, an offload service discovery message acknowledgement 1004B in response to the offload service discovery message 1002B, wherein the offload service discovery message acknowledgement 1004B indicates receipt of the offload service discovery message 1002B and the presence of the offload service 100 in the network system 1300.

Alternatively, the method 1600 may commence at operation 1606 with the offload service 100 receiving an offload service discovery message 902B from each network resource 204 in a set of network resources $204_1$ and $204_2$.

At operation 1608, the offload service 100 transmits an offload service discovery message acknowledgement 904B to each network resource 204 in the set of network resources $204_1$ and $204_2$ in response to the offload service discovery messages 1002B.

At operation 1610, the offload service 100 receives a network resource registration request 906B from each network resource 204 in the set of network resources $204_1$ and $204_2$.

At operation 1612, the offload service 100 updates a network resource information model 908B and a network model 910B based on the network resource registration request 906B from each network resource 204 in the set of network resources $204_1$ and $204_2$. In some embodiments, the network resource information model 908B describes characteristics of each of the network resources 204 in the set of network resources $204_1$ and $204_2$ and the network model 910B describes the interconnections between elements in the network system 1300, including the set of network resources $204_1$ and $204_2$ and a compute node $1302_1$ on which the first application $202_1$ is operating.

At operation 1614 the offload service 100 transmits a network resource registration request acknowledgement 912B to each network resource 204 in the set of network resources $204_1$ and $204_2$ to indicate successful registration of each respective network resource 204 in the set of network resources $204_1$ and $204_2$.

At operation 1616, the offload service 100 receives an offload service capabilities request message 1006B from the first application $202_1$. In some embodiments, the offload service capabilities request message 1006B requests information from the offload service 100 regarding capabilities of the offload service 100 that meet a set of requirements provided by the first application $202_1$.

At operation 1618, the offload service 100 transmits an offload service capabilities request message response 1008B to the first application $202_1$, wherein the offload service capabilities request message response 1008B includes a set of offload service templates 110 that are (1) selected by the offload service 100 based on the set of requirements of the first application $202_1$ and (2) possible templates to be modified for performing network operations of the first application $202_1$. In some embodiments, each template in the set of offload service templates 110 includes one or more of a parameter list to be modified for performance of the network operations of the first application $202_1$, a set of code stubs for use in generating program code for performance of the network operations of the first application $202_1$, and a set of libraries for use in generating the program code. In one embodiment, the network resources 204 are P4 network resources 204 and the program code is P4 program code.

At operation 1620, the offload service 100 receives from the first application $202_1$ an application offload service request 1010B, which includes a template from the set of templates 110 that is populated for performing the network operations of the first application $202_1$.

At operation 1622, the offload service 100 evaluates 1012B the network resources 204 for the program code of the first application $202_1$ to select a set of network resources $204_1$ and $204_2$ for installing the program code and offloading the operations of the first application $202_1$ to the set of network resources $204_1$ and $204_2$.

At operation 1624, the offload service 100 transmits an application offload service request acknowledgement 1014B to indicate that the set of network resources 204 were located for hosting the program code for the first application $202_1$ and the program code is properly adapted for the set of network resources $204_1$ and $204_2$.

At operation 1626, the offload service 100 receives an application offload deployment request 1016B from the first application $202_1$ to commence offloading operations.

At operation 1628, the offload service 100 installs the program code for the first application $202_1$, which was generated based on the set of offload service templates 110, on the set of network resources $204_1$ and $204_2$ such that the set of network resources $204_1$ and $204_2$ process one or more of (1) packets from a second application $202_2$ that are addressed to the first application $202_1$ and (2) packets from the first application $202_1$ that are addressed to the second application $202_2$. In particular, installing the program code on the set of network resources $204_1$ and $204_2$ may include by the offload service 100 (1) transmitting at sub-operation 1628A an offload service deployment request 1018B to the set of network resources $204_1$ and $204_2$ that includes the program code such that each network resource 204 in the set of network resources $204_1$ and $204_2$ installs the program code and (2) receiving at sub-operation 1628B an offload service deployment request acknowledgement 1022B from each network resource 204 in the set of network resources $204_1$ and $204_2$ following successful installation by the set of network resources $204_1$ and $204_2$ of the program code.

At operation 1630, the offload service 100 transmits an application offload deployment request acknowledgment 1024B to the first application 202₁ to confirm deployment of the program code. In one embodiment, interaction with the first application 202₁ and the second application 202₂ is performed via an application offload service proxy 118 of the offload service 100 that allows the first application 202₁ to manage, configure, provision, and communicate with the offload service 100. In some embodiments, the packets addressed to the first application 202₁ are either (1) processed by the set of network resources 204₁ and 204₂ and thereafter forwarded to the application offload service proxy 118 before arriving at the first application 202₁ or (2) transmitted to the application offload service proxy 118 and forwarded to the set of network resources 204₁ and 204₂ for processing before arriving at the first application 202₁.

At operation 1632, the offload service 100 receives a set of control packets from the first application 202₁ for one or more of managing, configuring, and provisioning program code installed on the set of network resources 204₁ and 204₂.

At operation 1634, the offload service 100 receives from the first application 202₁, an application offload service termination request 1102B.

At operation 1636, the offload service 100 determines that the set of network resources 204₁ and 204₂ are allocated to the first application 202₁.

At operation 1638, the offload service 100 transmits an offload service termination request 1106B to each network resource 204 in the set of network resources 204₁ and 204₂.

At operation 1640, the offload service 100 receives an offload service termination request acknowledgement 1110B to indicate the program code is no longer being processed by the set of network resources 204₁ and 204₂.

At operation 1642, the offload service 100 updates a network resource information model to indicate the termination of the set of network resources 204₁ and 204₂.

At operation 1644, the offload service 100 transmits an application offload service termination request 1112B to the first application to indicate that offloading of the operations of the first application 202₁ by the offload service 100 has been terminated.

At operation 1646, the offload service 100 receives, from a network resource 204₁ in the set of network resources 204₁ and 204₂, a network resource deregistration request 1202B.

At operation 1648, the offload service 100 transmits an unsolicited application offload service termination request 1204B to the first application 202₁.

At operation 1650, the offload service 100 receives an unsolicited application offload service termination request acknowledgement 1208B to indicate that the first application 202₁ has performed a handover procedure to account for the network resource 204₁ no longer processing the program code.

At operation 1652, the offload service 100 updates a network model for the network system 1300 to account for the network resource 204₁ no longer being available for offloading operations.

At operation 1654, the offload service 100 transmits a network resource deregistration request acknowledgment 1212B to the network resource 204₁.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 17A:
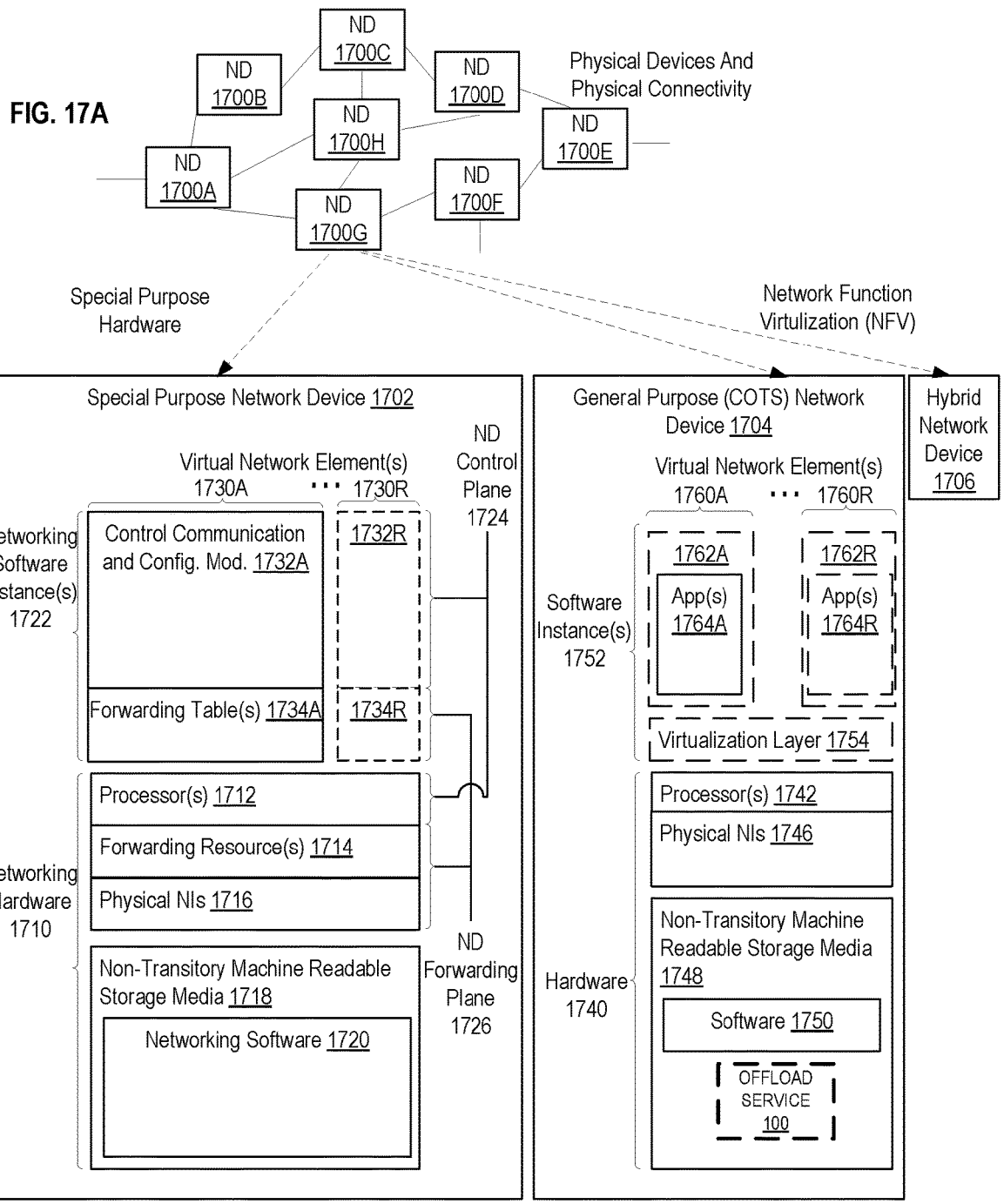
FIG. 17A illustrates connectivity between network devices (NDs) within an exemplary network, as well as three exemplary implementations of the NDs, according to some embodiments of the invention.

FIG. 17A illustrates connectivity between network devices (NDs) within an exemplary network, as well as three exemplary implementations of the NDs, according to some embodiments of the invention. FIG. 17A shows NDs 1700A-H, and their connectivity by way of lines between 1700A-1700B, 1700B-1700C, 1700C-1700D, 1700D-1700E, 1700E-1700F, 1700F-1700G, and 1700A-1700G, as well as between 1700H and each of 1700A, 1700C, 1700D, and 1700G. These NDs are physical devices, and the connectivity between these NDs can be wireless or wired (often referred to as a link). An additional line extending from NDs 1700A, 1700E, and 1700F illustrates that these NDs act as ingress and egress points for the network (and thus, these NDs are sometimes referred to as edge NDs; while the other NDs may be called core NDs).

Two of the exemplary ND implementations in FIG. 17A are: 1) a special-purpose network device 1702 that uses custom application-specific integrated-circuits (ASICs) and a special-purpose operating system (OS); and 2) a general purpose network device 1704 that uses common off-the-shelf (COTS) processors and a standard OS.

The special-purpose network device 1702 includes networking hardware 1710 comprising a set of one or more processor(s) 1712, forwarding resource(s) 1714 (which typically include one or more ASICs and/or network processors), and physical network interfaces (NIs) 1716 (through which network connections are made, such as those shown by the connectivity between NDs 1700A-H), as well as non-transitory machine readable storage media 1718 having stored therein networking software 1720. During operation, the networking software 1720 may be executed by the networking hardware 1710 to instantiate a set of one or more networking software instance(s) 1722. Each of the networking software instance(s) 1722, and that part of the networking hardware 1710 that executes that network software instance (be it hardware dedicated to that networking software instance and/or time slices of hardware temporally shared by that networking software instance with others of the networking software instance(s) 1722), form a separate virtual network element 1730A-R. Each of the virtual network element(s) (VNEs) 1730A-R includes a control communication and configuration module 1732A-R (sometimes referred to as a local control module or control communication module) and forwarding table(s) 1734A-R, such that a given virtual network element (e.g., 1730A) includes the control communication and configuration module (e.g., 1732A), a set of one or more forwarding table(s) (e.g., 1734A), and that portion of the networking hardware 1710 that executes the virtual network element (e.g., 1730A).

The special-purpose network device 1702 is often physically and/or logically considered to include: 1) a ND control plane 1724 (sometimes referred to as a control plane) comprising the processor(s) 1712 that execute the control communication and configuration module(s) 1732A-R; and 2) a ND forwarding plane 1726 (sometimes referred to as a forwarding plane, a data plane, or a media plane) comprising the forwarding resource(s) 1714 that utilize the forwarding table(s) 1734A-R and the physical NIs 1716. By way of example, where the ND is a router (or is implementing routing functionality), the ND control plane 1724 (the processor(s) 1712 executing the control communication and configuration module(s) 1732A-R) is typically responsible for participating in controlling how data (e.g., packets) is to be routed (e.g., the next hop for the data and the outgoing physical NI for that data) and storing that routing information in the forwarding table(s) 1734A-R, and the ND forwarding plane 1726 is responsible for receiving that data on the physical NIs 1716 and forwarding that data out the appropriate ones of the physical NIs 1716 based on the forwarding table(s) 1734A-R.

Figure 17B:
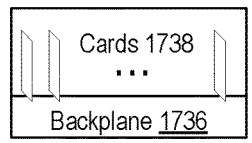
FIG. 17B illustrates an exemplary way to implement a special-purpose network device according to some embodiments of the invention.

FIG. 17B illustrates an exemplary way to implement the special-purpose network device 1702 according to some embodiments of the invention. FIG. 17B shows a special-purpose network device including cards 1738 (typically hot pluggable). While in some embodiments the cards 1738 are of two types (one or more that operate as the ND forwarding plane 1726 (sometimes called line cards), and one or more that operate to implement the ND control plane 1724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1736 (e.g., a first full mesh coupling the line cards and a second full mesh coupling all of the cards).

Returning to FIG. 17A, the general purpose network device 1704 includes hardware 1740 comprising a set of one or more processor(s) 1742 (which are often COTS processors) and physical NIs 1746, as well as non-transitory machine readable storage media 1748 having stored therein software 1750 and/or the offload service 100. During operation, the processor(s) 1742 execute the software 1750 to instantiate one or more sets of one or more applications 1764A-R. While one embodiment does not implement virtualization, alternative embodiments may use different forms of virtualization. For example, in one such alternative embodiment the virtualization layer 1754 represents the kernel of an operating system (or a shim executing on a base operating system) that allows for the creation of multiple instances 1762A-R called software containers that may each be used to execute one (or more) of the sets of applications 1764A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1754 represents a hypervisor (sometimes referred to as a virtual machine monitor (VMM)) or a hypervisor executing on top of a host operating system, and each of the sets of applications 1764A-R is run on top of a guest operating system within an instance 1762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1740, directly on a hypervisor (in which case the unikernel is sometimes described as running within a LibOS virtual machine), or in a software container, embodiments can be implemented fully with unikernels running directly on a hypervisor represented by virtualization layer 1754, unikernels running within software containers represented by instances 1762A-R, or as a combination of unikernels and the above-described techniques (e.g., unikernels and virtual machines both run directly on a hypervisor, unikernels and sets of applications that are run in different software containers).

The instantiation of the one or more sets of one or more applications 1764A-R, as well as virtualization if implemented, are collectively referred to as software instance(s) 1752. Each set of applications 1764A-R, corresponding virtualization construct (e.g., instance 1762A-R) if implemented, and that part of the hardware 1740 that executes them (be it hardware dedicated to that execution and/or time slices of hardware temporally shared), forms a separate virtual network element(s) 1760A-R.

The virtual network element(s) 1760A-R perform similar functionality to the virtual network element(s) 1730A-R— e.g., similar to the control communication and configuration module(s) 1732A and forwarding table(s) 1734A (this virtualization of the hardware 1740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 1762A-R corresponding to one VNE 1760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1762A-R to VNEs also apply to embodiments where such a finer level of granularity and/or unikernels are used.

In certain embodiments, the virtualization layer 1754 includes a virtual switch that provides similar forwarding services as a physical Ethernet switch. Specifically, this virtual switch forwards traffic between instances 1762A-R and the physical NI(s) 1746, as well as optionally between the instances 1762A-R; in addition, this virtual switch may enforce network isolation between the VNEs 1760A-R that by policy are not permitted to communicate with each other (e.g., by honoring virtual local area networks (VLANs)).

The third exemplary ND implementation in FIG. 17A is a hybrid network device 1706, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1702) could provide for para-virtualization to the networking hardware present in the hybrid network device 1706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1730A-R, VNEs 1760A-R, and those in the hybrid network device 1706) receives data on the physical NIs (e.g., 1716, 1746) and forwards that data out the appropriate ones of the physical NIs (e.g., 1716, 1746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 17C:
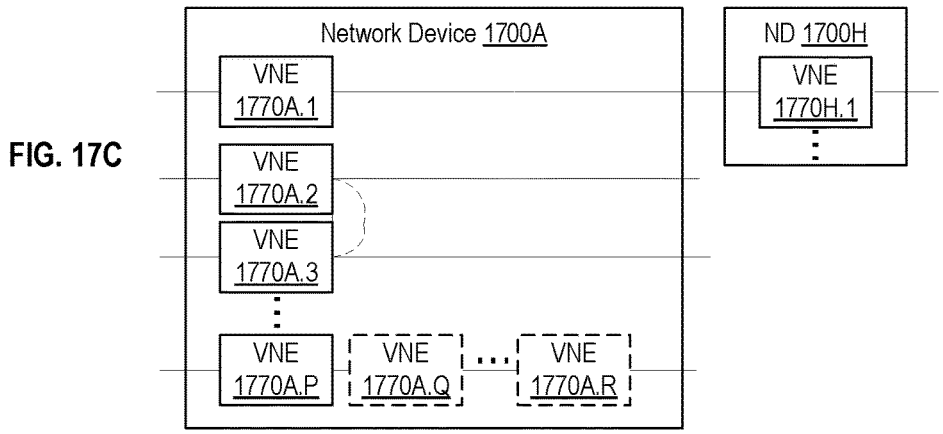
FIG. 17C illustrates various exemplary ways in which virtual network elements (VNEs) may be coupled according to some embodiments of the invention.

FIG. 17C illustrates various exemplary ways in which VNEs may be coupled according to some embodiments of the invention. FIG. 17C shows VNEs 1770A.1-1770A.P (and optionally VNEs 1770A.Q-1770A.R) implemented in ND 1700A and VNE 1770H.1 in ND 1700H. In FIG. 17C, VNEs 1770A.1-P are separate from each other in the sense that they can receive packets from outside ND 1700A and forward packets outside of ND 1700A; VNE 1770A.1 is coupled with VNE 1770H.1, and thus they communicate packets between their respective NDs; VNE 1770A.2-1770A.3 may optionally forward packets between themselves without forwarding them outside of the ND 1700A; and VNE 1770A.P may optionally be the first in a chain of VNEs that includes VNE 1770A.Q followed by VNE 1770A.R (this is sometimes referred to as dynamic service chaining, where each of the VNEs in the series of VNEs provides a different service—e.g., one or more layer 4-7 network services). While FIG. 17C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 17A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 17A may also host one or more such servers (e.g., in the case of the general purpose network device 1704, one or more of the software instances 1762A-R may operate as servers; the same would be true for the hybrid network device 1706; in the case of the special-purpose network device 1702, one or more such servers could also be run on a virtualization layer executed by the processor(s) 1712); in which case the servers are said to be co-located with the VNEs of that ND.

A virtual network is a logical abstraction of a physical network (such as that in FIG. 17A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 17D:
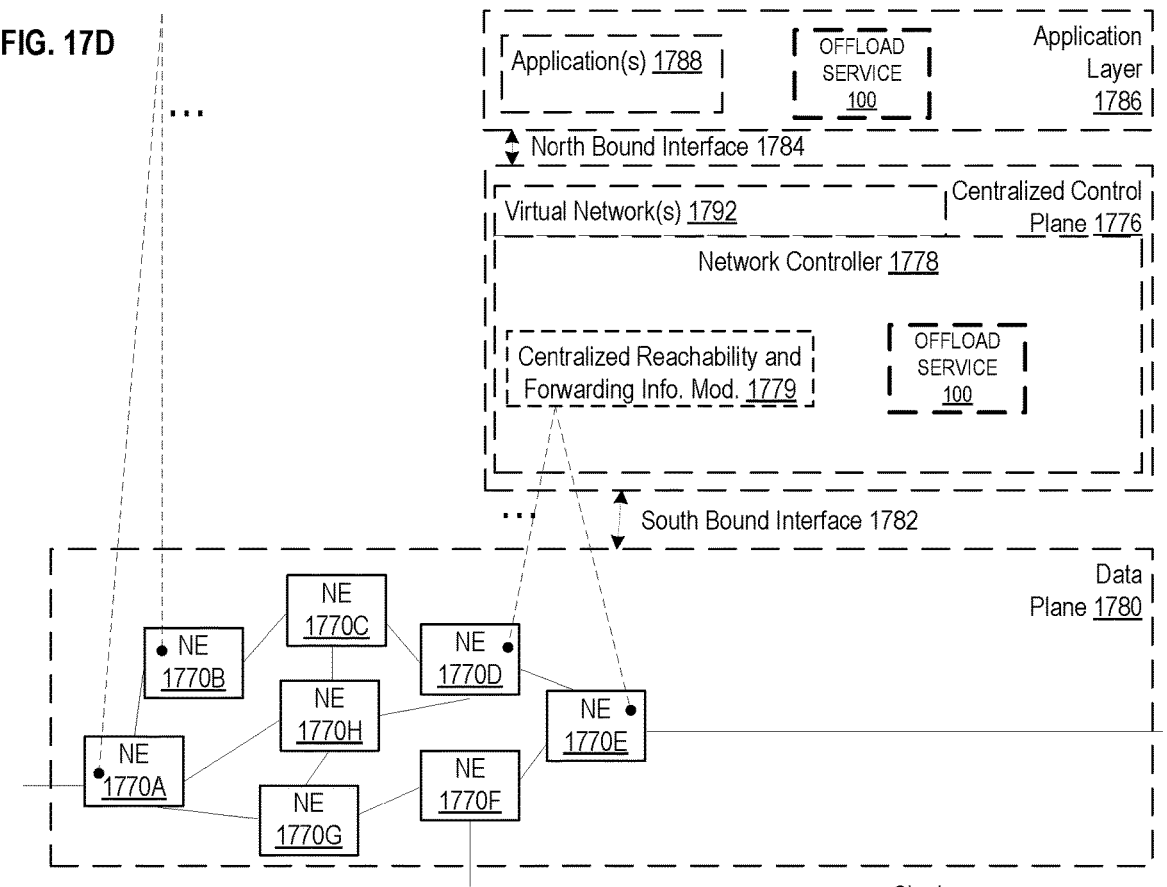
FIG. 17D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 17D illustrates a network with a single network element on each of the NDs of FIG. 17A, and within this straight forward approach contrasts a traditional distributed approach (commonly used by traditional routers) with a centralized approach for maintaining reachability and forwarding information (also called network control), according to some embodiments of the invention. Specifically, FIG. 17D illustrates network elements (NEs) 1770A-H with the same connectivity as the NDs 1700A-H of FIG. 17A.

FIG. 17D illustrates that the distributed approach 1772 distributes responsibility for generating the reachability and forwarding information across the NEs 1770A-H; in other words, the process of neighbor discovery and topology discovery is distributed.

For example, where the special-purpose network device 1702 is used, the control communication and configuration module(s) 1732A-R of the ND control plane 1724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1770A-H (e.g., the processor(s) 1712 executing the control communication and configuration module(s) 1732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1724. The ND control plane 1724 programs the ND forwarding plane 1726 with information (e.g., adjacency and route information) based on the routing structure(s). For example, the ND control plane 1724 programs the adjacency and route information into one or more forwarding table(s) 1734A-R (e.g., Forwarding Information Base (FIB), Label Forwarding Information Base (LFIB), and one or more adjacency structures) on the ND forwarding plane 1726. For layer 2 forwarding, the ND can store one or more bridging tables that are used to forward data based on the layer 2 information in that data. While the above example uses the special-purpose network device 1702, the same distributed approach 1772 can be implemented on the general purpose network device 1704 and the hybrid network device 1706.

FIG. 17D illustrates that a centralized approach 1774 (also known as software defined networking (SDN)) that decouples the system that makes decisions about where traffic is sent from the underlying systems that forwards traffic to the selected destination. The illustrated centralized approach 1774 has the responsibility for the generation of reachability and forwarding information in a centralized control plane 1776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1776 has a south bound interface 1782 with a data plane 1780 (sometime referred to the infrastructure layer, network forwarding plane, or forwarding plane (which should not be confused with a ND forwarding plane)) that includes the NEs 1770A-H (sometimes referred to as switches, forwarding elements, data plane elements, or nodes). The centralized control plane 1776 includes a network controller 1778, which includes a centralized reachability and forwarding information module 1779 that determines the reachability within the network and distributes the forwarding information to the NEs 1770A-H of the data plane 1780 over the south bound interface 1782 (which may use the OpenFlow protocol) and/or the offload service 100. Thus, the network intelligence is centralized in the centralized control plane 1776 executing on electronic devices that are typically separate from the NDs.

For example, where the special-purpose network device 1702 is used in the data plane 1780, each of the control communication and configuration module(s) 1732A-R of the ND control plane 1724 typically include a control agent that provides the VNE side of the south bound interface 1782. In this case, the ND control plane 1724 (the processor(s) 1712 executing the control communication and configuration module(s) 1732A-R) performs its responsibility for participating in controlling how data (e.g., packets) is to be routed (e.g., the next hop for the data and the outgoing physical NI for that data) through the control agent communicating with the centralized control plane 1776 to receive the forwarding information (and in some cases, the reachability information) from the centralized reachability and forwarding information module 1779 (it should be understood that in some embodiments of the invention, the control communication and configuration module(s) 1732A-R, in addition to communicating with the centralized control plane 1776, may also play some role in determining reachability and/or calculating forwarding information—albeit less so than in the case of a distributed approach; such embodiments are generally considered to fall under the centralized approach 1774, but may also be considered a hybrid approach).

While the above example uses the special-purpose network device 1702, the same centralized approach 1774 can be implemented with the general purpose network device 1704 (e.g., each of the VNE 1760A-R performs its responsibility for controlling how data (e.g., packets) is to be routed (e.g., the next hop for the data and the outgoing physical NI for that data) by communicating with the centralized control plane 1776 to receive the forwarding information (and in some cases, the reachability information) from the centralized reachability and forwarding information module 1779; it should be understood that in some embodiments of the invention, the VNEs 1760A-R, in addition to communicating with the centralized control plane 1776, may also play some role in determining reachability and/or calculating forwarding information—albeit less so than in the case of a distributed approach) and the hybrid network device 1706. In fact, the use of SDN techniques can enhance the NFV techniques typically used in the general purpose network device 1704 or hybrid network device 1706 implementations as NFV is able to support SDN by providing an infrastructure upon which the SDN software can be run, and NFV and SDN both aim to make use of commodity server hardware and physical switches.

FIG. 17D also shows that the centralized control plane 1776 has a north bound interface 1784 to an application layer 1786, in which resides application(s) 1788. The centralized control plane 1776 has the ability to form virtual networks 1792 (sometimes referred to as a logical forwarding plane, network services, or overlay networks (with the NEs 1770A-H of the data plane 1780 being the underlay network)) for the application(s) 1788. Thus, the centralized control plane 1776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 17D shows the distributed approach 1772 separate from the centralized approach 1774, the effort of network control may be distributed differently or the two combined in certain embodiments of the invention. For example: 1) embodiments may generally use the centralized approach (SDN) 1774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1774, but may also be considered a hybrid approach.

While FIG. 17D illustrates the simple case where each of the NDs 1700A-H implements a single NE 1770A-H, it should be understood that the network control approaches described with reference to FIG. 17D also work for networks where one or more of the NDs 1700A-H implement multiple VNEs (e.g., VNEs 1730A-R, VNEs 1760A-R, those in the hybrid network device 1706). Alternatively or in addition, the network controller 1778 may also emulate the implementation of multiple VNEs in a single ND. Specifically, instead of (or in addition to) implementing multiple VNEs in a single ND, the network controller 1778 may present the implementation of a VNE/NE in a single ND as multiple VNEs in the virtual networks 1792 (all in the same one of the virtual network(s) 1792, each in different ones of the virtual network(s) 1792, or some combination). For example, the network controller 1778 may cause an ND to implement a single VNE (a NE) in the underlay network, and then logically divide up the resources of that NE within the centralized control plane 1776 to present different VNEs in the virtual network(s) 1792 (where these different VNEs in the overlay networks are sharing the resources of the single VNE/NE implementation on the ND in the underlay network).

Figure 17E:
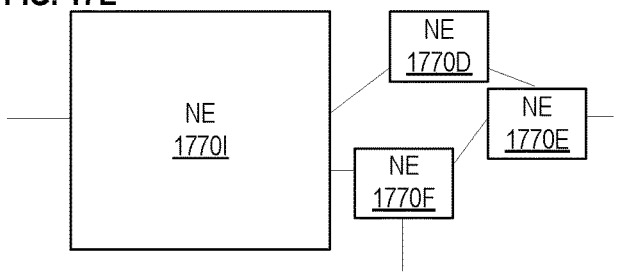
FIG. 17E illustrates the simple case of where each of the NDs implements a single NE, but a centralized control plane has abstracted multiple of the NEs in different NDs into (to represent) a single NE in one of the virtual network(s), according to some embodiments of the invention.
Figure 17F:
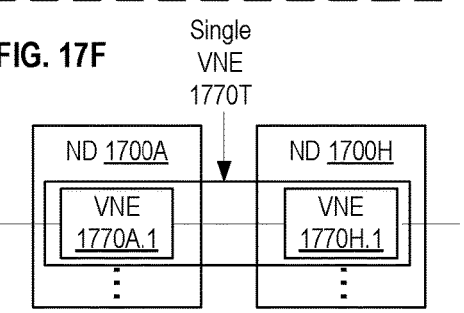
FIG. 17F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 17E and 17F respectively illustrate exemplary abstractions of NEs and VNEs that the network controller 1778 may present as part of different ones of the virtual networks 1792. FIG. 17E illustrates the simple case of where each of the NDs 1700A-H implements a single NE 1770A-H (see FIG. 17D), but the centralized control plane 1776 has abstracted multiple of the NEs in different NDs (the NEs 1770A-C and G-H) into (to represent) a single NE 1770I in one of the virtual network(s) 1792 of FIG. 17D, according to some embodiments of the invention. FIG. 17E shows that in this virtual network, the NE 1770I is coupled to NE 1770D and 1770F, which are both still coupled to NE 1770E.

FIG. 17F illustrates a case where multiple VNEs (VNE 1770A.1 and VNE 1770H.1) are implemented on different NDs (ND 1700A and ND 1700H) and are coupled to each other, and where the centralized control plane 1776 has abstracted these multiple VNEs such that they appear as a single VNE 1770T within one of the virtual networks 1792 of FIG. 17D, according to some embodiments of the invention. Thus, the abstraction of a NE or VNE can span multiple NDs.

While some embodiments of the invention implement the centralized control plane 1776 as a single entity (e.g., a single instance of software running on a single electronic device), alternative embodiments may spread the functionality across multiple entities for redundancy and/or scalability purposes (e.g., multiple instances of software running on different electronic devices).

Figure 18:
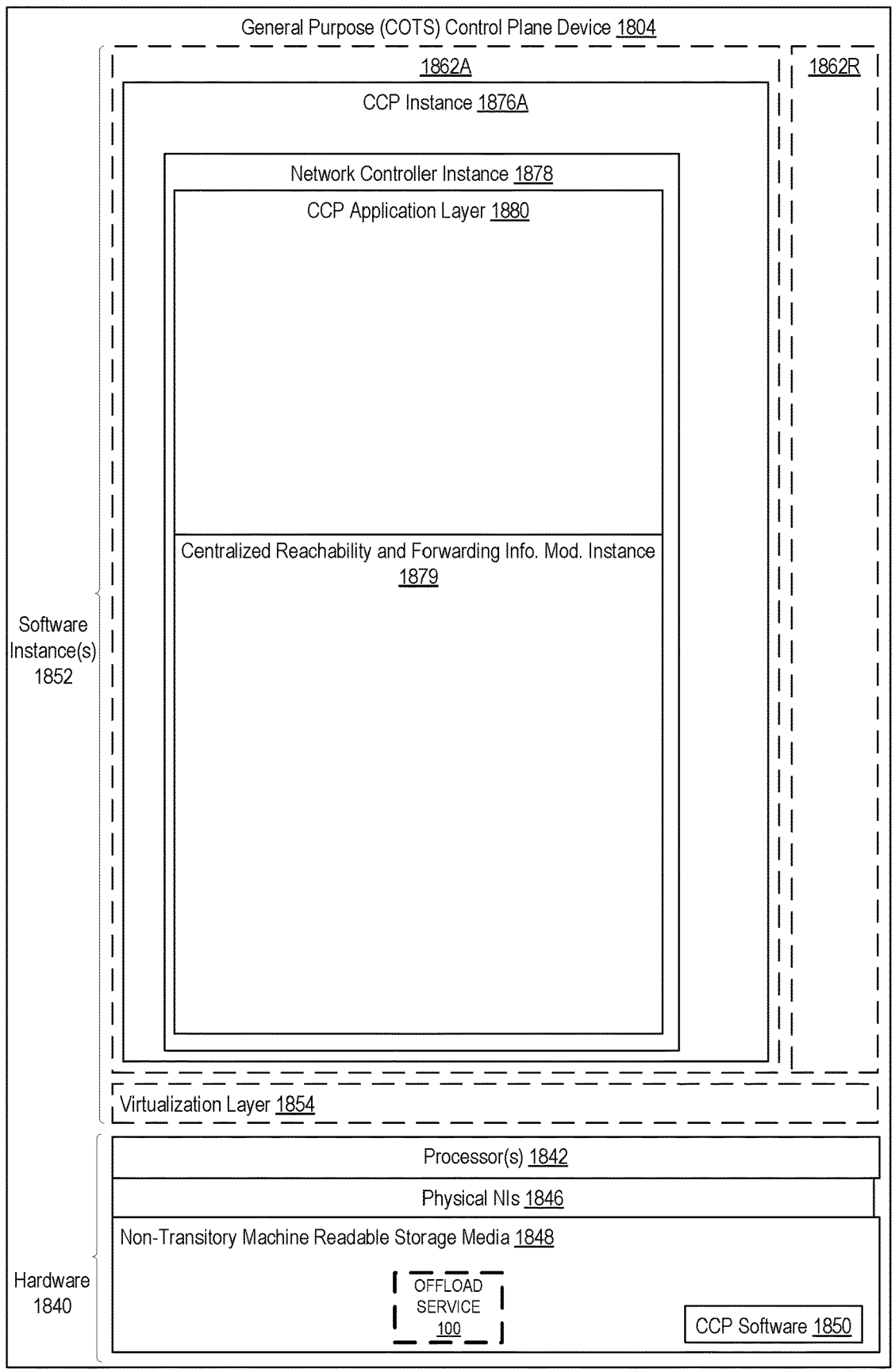
FIG. 18 illustrates a general-purpose control plane device with centralized control plane (CCP) software, according to some embodiments of the invention.

Similar to the network device implementations, the electronic device(s) running the centralized control plane 1776, and thus the network controller 1778 including the centralized reachability and forwarding information module 1779, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 18 illustrates, a general-purpose control plane device 1804 including hardware 1840 comprising a set of one or more processor(s) 1842 (which are often COTS processors) and physical NIs 1846, as well as non-transitory machine readable storage media 1848 having stored therein centralized control plane (CCP) software 1850 and/or the offload service 100.

In embodiments that use compute virtualization, the processor(s) 1842 typically execute software to instantiate a virtualization layer 1854 (e.g., in one embodiment the virtualization layer 1854 represents the kernel of an operating system (or a shim executing on a base operating system) that allows for the creation of multiple instances 1862A-R called software containers (representing separate user spaces and also called virtualization engines, virtual private servers, or jails) that may each be used to execute a set of one or more applications; in another embodiment the virtualization layer 1854 represents a hypervisor (sometimes referred to as a virtual machine monitor (VMM)) or a hypervisor executing on top of a host operating system, and an application is run on top of a guest operating system within an instance 1862A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1840, directly on a hypervisor represented by virtualization layer 1854 (in which case the unikernel is sometimes described as running within a LibOS virtual machine), or in a software container represented by one of instances 1862A-R). Again, in embodiments where compute virtualization is used, during operation an instance of the CCP software 1850 (illustrated as CCP instance 1876A) is executed (e.g., within the instance 1862A) on the virtualization layer 1854. In embodiments where compute virtualization is not used, the CCP instance 1876A is executed, as a unikernel or on top of a host operating system, on the "bare metal" general purpose control plane device 1804. The instantiation of the CCP instance 1876A, as well as the virtualization layer 1854 and instances 1862A-R if implemented, are collectively referred to as software instance(s) 1852.

In some embodiments, the CCP instance 1876A includes a network controller instance 1878. The network controller instance 1878 includes a centralized reachability and forwarding information module instance 1879 (which is a middleware layer providing the context of the network controller 1778 to the operating system and communicating with the various NEs), and an CCP application layer 1880 (sometimes referred to as an application layer) over the middleware layer (providing the intelligence required for various network operations such as protocols, network situational awareness, and user-interfaces). At a more abstract level, this CCP application layer 1880 within the centralized control plane 1776 works with virtual network view(s) (logical view(s) of the network) and the middleware layer provides the conversion from the virtual networks to the physical view.

The centralized control plane 1776 transmits relevant messages to the data plane 1780 based on CCP application layer 1880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 1780 may receive different messages, and thus different forwarding information. The data plane 1780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1780, the packet (or a subset of the packet header and content) is typically forwarded to the centralized control plane 1776. The centralized control plane 1776 will then program forwarding table entries into the data plane 1780 to accommodate packets belonging to the flow of the unknown packet. Once a specific forwarding table entry has been programmed into the data plane 1780 by the centralized control plane 1776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for offloading network operations of a first application to network resources in a network system, the method comprising:

receiving, by an offload service, an offload service capabilities request message from the first application, wherein the offload service capabilities request message requests information from the offload service regarding capabilities of the offload service that meet a set of requirements provided by the first application;

transmitting, by the offload service, an offload service capabilities request message response to the first application, wherein the offload service capabilities request message response includes a set of offload service templates that are (1) selected by the offload service based on the set of requirements of the first application and (2) possible templates to be modified for performing network operations of the first application, wherein each template in the set of offload service templates includes one or more of a parameter list to be modified for performance of the network operations of the first application, a set of code stubs for use in generating program code for performance of the network operations of the first application, and a set of libraries for use in generating the program code;

evaluating, by the offload service, the network resources for the program code of the first application to select a set of network resources for installing the program and offloading network operations of the first application to the set of network resources; and installing, by the offload service, the program code for the first application, which was generated based on the set of offload service templates, on the set of network resources such that the set of network resources process one or more of (1) packets from a second application that are addressed to the first application and (2) packets from the first application that are addressed to the second application.

2. The method of claim 1, further comprising:

receiving, by the offload service from the first application, an offload service discovery message; and transmitting, by the offload service to the first application, an offload service discovery message acknowledgement in response to the offload service discovery message, wherein the offload service discovery message acknowledgement indicates receipt of the offload service discovery message and a presence of the offload service in the network system.

3. The method of claim 2, further comprising:

receiving, by the offload service from the first application, an application offload service request, which includes a template from the set of templates that is populated for performing the network operations of the first application;

transmitting, by the offload service, an application offload service request acknowledgement to indicate that the set of network resources were located for hosting the program code for the first application and the program code is properly adapted for the set of network resources; and receiving, by the offload service, an application offload deployment request from the first application to commence offloading operations.

4. The method of claim 3, wherein installing the program code on the set of network resources comprises:

transmitting, by the offload service, an offload service deployment request to the set of network resources that includes the program code such that each network resource in the set of network resources installs the program code; and receiving, by the offload service, an offload service deployment request acknowledgement from each network resource in the set of network resources following successful installation by the set of network resources of the program code, wherein the method further comprises:

transmitting, by the offload service, an application offload deployment request acknowledgment to the first application to confirm deployment of the program code.

5. The method of claim 1, further comprising:

receiving, by the offload service, an offload service discovery message from each network resource in the set of network resources;

transmitting, by the offload service, an offload service discovery message acknowledgement to each network resource in the set of network resources in response to the offload service discovery messages;

receiving, by the offload service, a network resource registration request from each network resource in the set of network resources;

updating, by the offload service, a network resource information model and a network model based on the network resource registration request from each network resource in the set of network resources, wherein the network resource information model describes characteristics of each of the network resources in the set of network resources, and wherein the network model describes interconnections between elements in the network system, including the set of network resources and a compute node on which the first application is operating; and transmitting, by the offload service, a network resource registration request acknowledgement to each network resource in the set of network resources to indicate successful registration of each respective network resource in the set of network resources; and wherein the characteristics of each of the network resources includes one or more of (1) an architecture of each network resource in the set of network resources, (2) processing power of each network resource in the set of network resources, and (3) memory capacity of each network resource in the set of network resources.

6. The method of claim 1, further comprising:

receiving, by the offload service from the first application, an application offload service termination request;

determining, by the offload service, that the set of network resources are allocated to the first application;

transmitting, by the offload service, an offload service termination request to each network resource in the set of network resources;

receiving, by the offload service, an offload service termination request acknowledgement to indicate the program code is no longer being processed by the set of network resources;

updating, by the offload service, a network resource information model to indicate the termination of the set of network resources; and transmitting, by the offload service, an application offload service termination request acknowledgement to the first application to indicate that offloading of the operations of the first application by the offload service has been terminated.

7. The method of claim 1, further comprising:

receiving, by the offload service from a network resource in the set of network resources, a network resource deregistration request;

transmitting, by the offload service, an unsolicited application offload service termination request to the first application;

receiving, by the offload service, an unsolicited application offload service termination request acknowledgement to indicate that the first application has performed a handover procedure to account for the network resource no longer processing the program code;

updating, by the offload service, a network resource information model for the network system to account for the network resource no longer being available for offloading operations; and transmitting, by the offload service, a network resource deregistration request acknowledgment to the network resource.

8. The method of claim 1, further comprising:

receiving, by the offload service, a set of control packets from the first application for one or more of managing, configuring, and provisioning program code installed on the set of network resources, wherein interaction with the first application and the second application is performed via an application offload service proxy of the offload service that allows the first application to manage, configure, provision, and communicate with the offload service; and wherein the packets addressed to the first application are either (1) processed by the set of network resources and thereafter forwarded to the application offload service proxy before arriving at the first application or (2) transmitted to the application offload service proxy and forwarded to the set of network resources for processing before arriving at the first application.

9. A non-transitory machine-readable storage medium that provides instructions that, when executed by a processor of a device in a network system, will cause said processor to perform operations comprising:

receiving an offload service capabilities request message from a first application, wherein the offload service capabilities request message requests information from an offload service regarding capabilities of the offload service that meet a set of requirements provided by the first application;

transmitting an offload service capabilities request message response to the first application, wherein the offload service capabilities request message response includes a set of offload service templates that are (1) selected by the offload service based on the set of requirements of the first application and (2) possible templates to be modified for performing network operations of the first application, wherein each template in the set of offload service templates includes one or more of a parameter list to be modified for performance of the network operations of the first application, a set of code stubs for use in generating program code for performance of the network operations of the first application, and a set of libraries for use in generating the program code;

evaluating the network resources for the program code of the first application to select a set of network resources for installing the program and offloading network operations of the first application to the set of network resources; and installing the program code for the first application, which was generated based on the set of offload service templates, on the set of network resources such that the set of network resources process one or more of (1) packets from a second application that are addressed to the first application and (2) packets from the first application that are addressed to the second application.

10. The non-transitory machine-readable storage medium of claim 9, wherein the operations further comprise:

receiving from the first application an offload service discovery message;

transmitting to the first application an offload service discovery message acknowledgement in response to the offload service discovery message, wherein the offload service discovery message acknowledgement indicates receipt of the offload service discovery message and a presence of the offload service in the network system;

receiving from the first application an application offload service request, which includes a template from the set of templates that is populated for performing the network operations of the first application;

transmitting, by the offload service, an application offload service request acknowledgement to indicate that the set of network resources were located for hosting the program code for the first application and the program code is properly adapted for the set of network resources; and receiving, by the offload service, an application offload deployment request from the first application to commence offloading operations.

11. The non-transitory machine-readable storage medium of claim 10, wherein installing the program code on the set of network resources comprises:

transmitting an offload service deployment request to the set of network resources that includes the program code such that each network resource in the set of network resources installs the program code; and receiving an offload service deployment request acknowledgement from each network resource in the set of network resources following successful installation by the set of network resources of the program code, wherein the operations further comprise:

transmitting, by the offload service, an application offload deployment request acknowledgment to the first application to confirm deployment of the program code.

12. The non-transitory machine-readable storage medium of claim 9, wherein the operations further comprise:

receiving an offload service discovery message from each network resource in the set of network resources;

transmitting an offload service discovery message acknowledgement to each network resource in the set of network resources in response to the offload service discovery messages;

receiving a network resource registration request from each network resource in the set of network resources;

updating a network resource information model and a network model based on the network resource registration request from each network resource in the set of network resources, wherein the network resource information model describes characteristics of each of the network resources in the set of network resources and wherein the network model describes interconnections between elements in the network system, including the set of network resources and a compute node on which the first application is operating; and transmitting, by the offload service, a network resource registration request acknowledgement to each network resource in the set of network resources to indicate successful registration of each respective network resource in the set of network resources, wherein the characteristics of each of the network resources includes one or more of (1) an architecture of each network resource in the set of network resources, (2) processing power of each network resource in the set of network resources, and (3) memory capacity of each network resource in the set of network resources.

13. The non-transitory machine-readable storage medium of claim 9, wherein the operations further comprise:

receiving from the first application an application offload service termination request;

determining that the set of network resources are allocated to the first application;

transmitting an offload service termination request to each network resource in the set of network resources;

receiving an offload service termination request acknowledgement to indicate the program code is no longer being processed by the set of network resources;

updating a network resource information model to indicate the termination of the set of network resources; and transmitting an application offload service termination request acknowledgement to the first application to indicate that offloading of the operations of the first application by the offload service has been terminated.

14. The non-transitory machine-readable storage medium of claim 9, wherein the operations further comprise:
receiving, by the offload service from a network resource in the set of network resources, a network resource deregistration request;
transmitting, by the offload service, an unsolicited application offload service termination request to the first application;
receiving, by the offload service, an unsolicited application offload service termination request acknowledgement to indicate that the first application has performed a handover procedure to account for the network resource no longer processing the program code;
updating, by the offload service, a network resource information model for the network system to account for the network resource no longer being available for offloading operations; and
transmitting, by the offload service, a network resource deregistration request acknowledgment to the network resource.

15. The non-transitory machine-readable storage medium of claim 9, wherein the operations further comprise:
receiving, by the offload service, a set of control packets from the first application for one or more of managing, configuring, and provisioning program code installed on the set of network resources,
wherein interaction with the first application and the second application is performed via an application offload service proxy of the offload service that allows the first application to manage, configure, provision, and communicate with the offload service; and
wherein the packets addressed to the first application are either (1) processed by the set of network resources and thereafter forwarded to the application offload service proxy before arriving at the first application or (2) transmitted to the application offload service proxy and forwarded to the set of network resources for processing before arriving at the first application.

16. A device for offloading network operations of a first application to network resources in a network system, the device comprising:
one or more processors; and
a non-transitory machine-readable storage medium comprising instructions that, when executed by the one or more processors, will cause the one or more processors to perform operations comprising:
receiving an offload service capabilities request message from the first application, wherein the offload service capabilities request message requests information from an offload service regarding capabilities of the offload service that meet a set of requirements provided by the first application;
transmitting an offload service capabilities request message response to the first application, wherein the offload service capabilities request message response includes a set of offload service templates that are (1) selected by the offload service based on the set of requirements of the first application and (2) possible templates to be modified for performing network operations of the first application, wherein each template in the set of offload service templates includes one or more of a parameter list to be modified for performance of the network operations of the first application, a set of code stubs for use in generating program code for performance of the network operations of the first application, and a set of libraries for use in generating the program code;
evaluating the network resources for the program code of the first application to select a set of network resources for installing the program and offloading network operations of the first application to the set of network resources; and
installing the program code for the first application, which was generated based on the set of offload service templates, on the set of network resources such that the set of network resources process one or more of (1) packets from a second application that are addressed to the first application and (2) packets from the first application that are addressed to the second application.

17. The device of claim 16, the operations further comprising:
receiving from the first application an offload service discovery message; and
transmitting to the first application an offload service discovery message acknowledgement in response to the offload service discovery message, wherein the offload service discovery message acknowledgement indicates receipt of the offload service discovery message and a presence of the offload service in the network system.

18. The device of claim 16, the operations further comprising:
receiving, by the offload service, an offload service discovery message from each network resource in the set of network resources;
transmitting, by the offload service, an offload service discovery message acknowledgement to each network resource in the set of network resources in response to the offload service discovery messages;
receiving, by the offload service, a network resource registration request from each network resource in the set of network resources;
updating, by the offload service, a network resource information model and a network model based on the network resource registration request from each network resource in the set of network resources, wherein the network resource information model describes characteristics of each of the network resources in the set of network resources, and wherein the network model describes interconnections between elements in the network system, including the set of network resources and a compute node on which the first application is operating; and
transmitting, by the offload service, a network resource registration request acknowledgement to each network resource in the set of network resources to indicate successful registration of each respective network resource in the set of network resources; and
wherein the characteristics of each of the network resources includes one or more of (1) an architecture of each network resource in the set of network resources, (2) processing power of each network resource in the set of network resources, and (3) memory capacity of each network resource in the set of network resources.

19. The device of claim 16, the operations further comprising:

receiving, by the offload service from the first application, an application offload service termination request;

determining, by the offload service, that the set of network resources are allocated to the first application;

transmitting, by the offload service, an offload service termination request to each network resource in the set of network resources;

receiving, by the offload service, an offload service termination request acknowledgement to indicate the program code is no longer being processed by the set of network resources;

updating, by the offload service, a network resource information model to indicate the termination of the set of network resources; and transmitting, by the offload service, an application offload service termination request acknowledgement to the first application to indicate that offloading of the operations of the first application by the offload service has been terminated.

20. The device of claim 16, the operations further comprising:

receiving, by the offload service from a network resource in the set of network resources, a network resource deregistration request;

transmitting, by the offload service, an unsolicited application offload service termination request to the first application;

receiving, by the offload service, an unsolicited application offload service termination request acknowledgement to indicate that the first application has performed a handover procedure to account for the network resource no longer processing the program code;

updating, by the offload service, a network resource information model for the network system to account for the network resource no longer being available for offloading operations; and transmitting, by the offload service, a network resource deregistration request acknowledgment to the network resource.

* * * * *